US012536260B2

(12) United States Patent
Dumitran et al.

(10) Patent No.: US 12,536,260 B2
(45) Date of Patent: Jan. 27, 2026

(54) SYSTEM, APPARATUS, AND METHOD FOR AUTOMATICALLY GENERATING NEGATIVE KEYSTROKE EXAMPLES AND TRAINING USER IDENTIFICATION MODELS BASED ON KEYSTROKE DYNAMICS

(71) Applicant: Veridium IP Limited, London (GB)

(72) Inventors: Ionut Dumitran, Bucharest (RO); Radu Tudor Ionescu, Bucharest (RO); Florinel-Alin Croitoru, Bucharest (RO); Cristina Mădălina Noaica, Bucharest (RO)

(73) Assignee: VERIDIUM IP LIMITED, London (GB)

( * ) Notice: Subject to any disclaimer, the term of this patent is extended or adjusted under 35 U.S.C. 154(b) by 738 days.

(21) Appl. No.: 17/938,431

(22) Filed: Oct. 6, 2022

(65) Prior Publication Data

US 2024/0134949 A1  Apr. 25, 2024

(51) Int. Cl.
*G06F 21/32* (2013.01)
(52) U.S. Cl.
CPC .................................. *G06F 21/32* (2013.01)
(58) Field of Classification Search
CPC ............................... G06F 21/32; G06F 21/316
See application file for complete search history.

(56) References Cited

U.S. PATENT DOCUMENTS

| 10,693,661 | B1* | 6/2020 | Hamlet | G06F 21/31 |
| 11,449,746 | B2* | 9/2022 | Baldwin | G06N 20/20 |
| 2019/0332876 | A1* | 10/2019 | Khitrov | G06F 21/32 |
| 2021/0216845 | A1* | 7/2021 | Walters | H04L 67/34 |

OTHER PUBLICATIONS

Fan, Zijian. "Applying generative adversarial networks for the generation of adversarial attacks against continuous authentication." (Year: 2020).*
Jinyin Chen, Yangyang Wu, Chengyu Jia, Haibin Zheng, Guohan Huang, Customizable text generation via conditional text generative adversarial network, Neurocomputing, vol. 416, 2020, pp. 125-135, ISSN 0925-2312, https://doi.org/10.1016/j.neucom.2018.12.092. (Year: 2020).*
Conijn, R., Cook, C., van Zaanen, M et al. Early prediction of writing quality using keystroke logging https://doi.org/10.1007/s40593-021-00268-w (Year: 2021).*

(Continued)

*Primary Examiner* — Michael J Huntley
*Assistant Examiner* — Alfredo Campos
(74) *Attorney, Agent, or Firm* — LEASON ELLIS LLP

(57) ABSTRACT

An apparatus adapted to identify a user based on keystroke dynamics of an input by the user, the apparatus adapted to: execute a first training phase of training a keystroke sample generator to generate negative keystroke samples; execute a second training phase of training a user identification model based at least in part on a plurality of negative keystroke samples generated using the keystroke sample generator; and execute a deployment of the user identification model to authenticate an input sample associated with the user using the trained user identification model.

20 Claims, 10 Drawing Sheets

(56) References Cited

OTHER PUBLICATIONS

Zhang, Yizhe, Zhe Gan, and Lawrence Carin. "Generating text via adversarial training." NIPS workshop on Adversarial Training. vol. 21. Academia. edu, 2016. (Year: 2016).*

Chang et al. "Machine Learning-Based Analysis of Free-Text Keystroke Dynamics" [retrieved on Nov. 8, 2025] Retrieved from the Internet <URL:https://arxiv.org/abs/2107.07409> (Year: 2021).*

Bitvai, Zsolt, and Trevor Cohn. "Non-linear text regression with a deep convolutional neural network." Proceedings of the 53rd Annual Meeting of the Association for Computational Linguistics and the 7th International Joint Conference on Natural Language Processing (vol. 2: Short Papers). 2015. (Year: 2015).*

D. Deb and M. M. Guirguis, "Use of Auxiliary Classifier Generative Adversarial Network in Touchstroke Authentication," 2020 19th IEEE International Conference on Machine Learning and Applications (ICMLA), Miami, FL, USA, 2020, pp. 252-257, doi: 10.1109/ICMLA51294.2020.00049. (Year: 2020).*

Antal, Margit and Lehel Nemes. "The MOBIKEY Keystroke Dynamics Password Database: Benchmark Results." Advances in Intelligent Systems and Computing, Computer Science On-line Conference (2016), vol. 465, pp. 35-46.

Migdal, Denis and Christophe Rosenberger. "Statistical modeling of keystroke dynamics samples for the generation of synthetic datasets." Future Gener. Comput. Syst. 100 (2019): 907-920.

González, Nahuel et al. "Towards liveness detection in keystroke dynamics: Revealing synthetic forgeries." Systems and Soft Computing (2022): vol. 4, 200037: pp. 1-12.

Monaco, John V. et al. "Spoofing key-press latencies with a generative keystroke dynamics model." 2015 IEEE 7th International Conference on Biometrics Theory, Applications and Systems (BTAS) (2015): 1-8.

Huster, Todd P. et al. "Pareto GAN: Extending the Representational Power of GANs to Heavy-Tailed Distributions." International Conference on Machine Learning (2021), pp. 4523-4532.

Goodfellow, I.J., Pouget-Abadie, J., Mirza, M., Xu, B., Warde-Farley, D., Ozair, S., Courville, A. and Bengio, Y. (2014) Generative Adversarial Nets. Proceedings of the 27th International Conference on Neural Information Processing Systems, 2, 2672-2680.

Bengio, Yoshua, et al. "Curriculum learning." Proceedings of the 26th Annual International Conference on Machine earning. 2009, pp. 41-48.

Park, Youngja, et al. "Learning from Others: User Anomaly Detection Using Anomalous Samples from Other Users", 18th International Conference, Austin, TX, USA, Lecture Notes in Computer Science, pp. 396-414. Sep. 21, 2015.

Buriro, Attaullah et al. "SWIPEGAN: Swiping Data Augmentation Using Generative Adversarial Networks for Smartphone User Authentication." Proceedings of the 3rd ACM Workshop on Wireless Security and Machine Learning (2021): 6 pages.

Acien, Alejandro et al. "TypeNet: Deep Learning Keystroke Biometrics." IEEE Transactions on Biometrics, Behavior, and Identity Science, vol. 4 No. 1 (2022): 57-70.

International Search Report and Written Opinion in PCT Application No. PCT/US2023/073965, mailed Dec. 4, 2023.

* cited by examiner

SYSTEM, APPARATUS, AND METHOD FOR AUTOMATICALLY GENERATING NEGATIVE KEYSTROKE EXAMPLES AND TRAINING USER IDENTIFICATION MODELS BASED ON KEYSTROKE DYNAMICS

FIELD

The present disclosure generally relates to a computer-implemented method of identifying a user based on keystroke dynamics of an input by the user and, more specifically, to a machine learning-based technique for generating synthetic negative keystroke samples for training a user identification model that is used to identify users based on keystroke samples received from the users.

BACKGROUND

Keystroke dynamics is a behavioral biometric that is used to recognize individuals based on their typing characteristics, regardless of whether the typing is performed on a physical or virtual keyboard. In other words, users of computing devices equipped with physical or virtual keyboards can be identified by analyzing their keyboard typing patterns. The scenarios in which the keystroke dynamics systems are implemented can be divided into two categories: fixed-text and free-text. In the fixed-text scenario, the text sequences employed for user enrollment and the ones used during user authentication are identical, representing passwords or usernames, for example. In the free-text scenario, the registration and authentication text sequences typed by the user are not necessarily matching, i.e., the user can type any text.

State-of-the-art methods for this task are commonly based on machine learning models that take a series of key press and release timestamps (events) as input and predict the probability that the input series belongs to a certain user. When the input text is a fixed component, machine learning models are likely to attain better accuracy rates. The user identification problem for the fixed-text scenario is usually addressed either as a binary classification problem or as an outlier detection problem.

In related research, this problem is commonly studied and evaluated in a simulated binary classification setting where multiple users type the same text, which enables the training and testing of binary classifiers that benefit from both positive and negative training keystroke samples for each user. The system learns to classify keystroke examples into genuine and impostor instances, using both positive data samples collected from the target user (the one that needs to be identified) and negative data samples collected from other users for training the system. Ideally, the binary classification system would use keystroke examples typed by other users (impostors, attackers) for the same text sequence as the one typed by the genuine user. In related literature, there are studies such as "Antal, M., Nemes, L.: *The MOBIKEY Keystroke Dynamics Password Database: Benchmark Results. In: Software Engineering Perspectives and Application in Intelligent Systems. Advances in Intelligent Systems and Computing*, vol 465, pp. 35-46, Springer, 2016" that empirically show that the binary classification approach yields better results when negative data samples from other users are available at training time. However, this scenario is not realistic because, in the real-world setting, each user has a different username and password. Furthermore, negatively labeled training examples produced by actual impostors cannot be collected on a consistent basis in real-world applications—for example, for each and every genuine user. Hence, this scenario can only be tested in simulated or laboratory conditions.

In this context, the conventional approach used in related literature is to employ one-class machine learning models, which are trained only on positive keystroke samples belonging to the target user. In the outlier detection setting, a system checks the divergence (difference) of a new text example (recorded during the user identification stage) from the keystroke samples available during training, while using only data samples collected from the target (genuine) user (the one that needs to be identified) for training the system. In other words, an outlier detection system does not use negative training examples (collected from other users).

Hence, one of the reasons using keystroke biometrics for user identification is a difficult task is the lack of sufficient negative examples collected in the real-world setting. Such negative examples are a key component for strengthening the ability of a biometric system based on keystroke dynamics to distinguish between a legitimate user and a possible attacker.

Conventional approaches to using negative examples have relied mainly on statistical principles. One such approach is to use negative examples corresponding to different strings typed by other users. However, such an approach results in the user identification task getting entangled with the text classification task. For example, positive samples can be discriminated from negative samples based on the typed text instead of the keystroke dynamics. Thus, without access to negative keystroke samples containing the same text as the positive samples, such models tend to make significantly more prediction errors in realistic settings than in simulated lab settings.

SUMMARY

In view of the shortcomings of conventional keystroke profiling techniques and the improvements provided by effective negative samples, the present disclosure provides a system and method for automatically generating negative keystroke samples for a target text and using the generated examples to train binary classifiers for user identification based on keystroke dynamics.

There have been studies on generating synthetic keystroke samples.

In one such study with the purpose of increasing the number of samples in the case of fixed-text (usually, passphrase) data sets, "Migdal, D., Rosenberger, C.: *Statistical modeling of keystroke dynamics samples for the generation of synthetic datasets. Future Generation Computer Systems*, vol. 100, pp. 907-920, 2019" evaluated a set of 19 distributions to understand which one had the best capability of representing a number of 6 duration times that could be extracted from any digraph (a set of two characters) from samples that belonged to real users. The authors concluded that, overall, the durations followed either a normal, a logistic, or a Gumbel distribution. The synthetic keystroke data was generated with the help of 6 random engine generators that followed a given law with parameters that were estimated for each digraph and user.

In another study, "González, N., Calot, E. P., Ierache, J. S., Hasperué, W.: *Towards liveness detection in keystroke dynamics: Revealing synthetic forgeries. Systems and Soft Computing*, vol. 4, p. 200037, 2022", with the purpose of providing a spoofing method, generated sequences of keys and their afferent keystroke timings, based on past observations of keystroke timings for those keys in free text, observations that were gathered either from the target user or from the general population. The timings were generated with multiple different methods—such as by averaging over the timing values from past observations or by sampling, with a random number between zero and one, the inverse of the continuous distribution function. The sampling method was found to be the most successful at improving the false acceptance rate when access to data from the target user was available.

The authors of "Monaco, J. V., Ali, M. L., Tappert, C. C.: *Spoofing key-press latencies with a generative keystroke dynamics model. In: IEEE International Conference on Biometrics Theory, Applications and Systems*, pp. 1-8, IEEE, 2015" proposed a Linguistic Buffer and Motor Control model that made use of observations of keystroke latencies from real key press and key release timestamps, without knowing the name of the key. The model generated empirical distributions of key-press latencies. The generative model used a 2-state Hidden Markov Models to determine, based on the observed keystroke latencies, if the user was in an active or passive state. The model generated log-normal random variables for each possible distance between keys for predefined texts that had information regarding the distances between the keys on a physical keyboard in the text. In other words, the generative model was mapping an observed typing pattern of a target user to a predetermined text that could be further used for spoofing. The experiments showed that the model started to generate synthetic samples that were able to increase the equal error rate (EER) of a biometric system up to 0.6, once it observed around 50 keystrokes for each given user.

A different approach from the previous ones was presented in "Huster, T., Cohen, J., Lin, Z., Chan, K., Kamhoua, C., Leslie, N. O., Chiang, C. Y. J., Sekar, V.: Pareto G A N: *Extending the representational power of GANs to heavy-tailed distributions. In: International Conference on Machine Learning*, pp. 4523-4532, PMLR, 2021". The authors argued that the existing generative adversarial network (GAN) architectures were intrinsically not able to match the asymptotic behavior of heavy-tailed distributions. Accordingly, they proposed a Pareto GAN as a solution, by leveraging extreme theory and the functional properties of neural networks to learn a distribution that matched the asymptotic behavior of the marginal distribution of the features. The Pareto GAN proved to outperform three baseline GANs (uniform, normal, lognormal) on the task of generating synthetic keystroke data in terms of similarity with the real data. The similarity was established based on Kolmogorov-Smirnov test statistics and on the area between the log-log plots of the empirical cumulative distribution functions of the synthetic and real samples.

GANs were initially proposed in "Goodfellow, I, Pouget-Abadie, J., Mirza, M., Xu, B., Warde-Farley, D., Ozair, S., Courville, A., Bengio, Y.: *Generative adversarial nets. In: Advances of Neural Information Processing*, pp. 2672-2680, 2014" as a method for digital image generation. A GAN comprises a generator and a discriminator that are trained in an adversarial fashion, where the generator aims to generate realistic images and the discriminator aims to distinguish between fake (generated) and natural images.

The present disclosure provides an improved method of generating negative keystroke samples for training a user identification classifier.

Different from the methods introduced in the related literature, the present disclosure introduces a novel neural architecture termed generative partner-adversarial network (GPAN) to generate keystroke samples. Unlike other GAN architectures, the disclosed architecture includes three actors instead of two:

1. A multi-modal generative neural network (that generates keystroke samples given a sequence of text, a user ID and a random noise vector). Typical generators take a single modality as input, while the disclosed generator is multi-modal, having three modalities as input.

2. A multi-class classification neural network (that discriminates between fake and several classes of real keystroke samples). Typical discriminators address a binary classification task (fake versus real), while the disclosed discriminator is multi-class, discriminating between real keystroke samples belonging to different users and fake keystroke samples.

3. A regression neural network (that predicts if the length of the generated keystroke samples is right). Typical GANs do not use a regressor that has a joint (instead of adversarial) objective with the generator.

The method comprises two training phases. In the first training phase, a novel generative partner-adversarial network (GPAN) is trained on a data set of keystroke timestamps recorded for a pool of users while typing free text. Different from related generative adversarial networks (GANs), the present disclosure presents a GPAN, which takes a user ID, a string, and a random noise vector together as input, and comprises user and text embedding layers before the generator, a multi-class classifier to predict whether a generated keystroke sample is fake or belongs to one of the users from the existing data set, a regressor to measure if the generated sample is of the right length (according to the input string), and a temporal consistency loss to ensure that the generated timestamps are temporally coherent. While the generator and the multi-class classifier are trained as adversaries (having opposing objectives), the generator and the regressor are trained as partners (having the same objective). Hence, the proposed architecture bears the name generative partner-adversarial network (GPAN).

In the second training phase, a binary user identification model is trained on positive keystroke timestamps, collected while the target user is typing a pre-established text, and negative keystroke timestamps, generated by the disclosed GPAN architecture. Upon training the user identification model, it can be deployed into a user identification system based on keystroke dynamics.

According to an example implementation of the present disclosure, an apparatus adapted to identify a user based on keystroke dynamics of an input by the user, comprises: a communication interface to one or more networks; one or more processing devices operatively connected to the computer network interface; and one or more memory storage devices operatively connected to the one or more processing devices and having stored thereon machine-readable instructions that, when executed, cause the one or more processing devices to: in a first training phase of training a keystroke sample generator, receive, via the communication interface, a plurality of first text input samples by a plurality of first users; and for each received first text input sample: generate a user identification representation, a noise representation, and a text sequence representation of the received first text input sample; generate, using the keystroke sample generator, a keystroke sequence sample based on a combination of the generated user identification representation, noise representation, and text sequence representation; input the generated keystroke sequence sample and an actual keystroke sequence of the received first text input sample to a classifier for a user identification classification on the generated keystroke sequence sample; input the generated keystroke sequence sample and the actual keystroke sequence of the received first text input sample to a regressor for a text character length regression on the generated keystroke sequence sample; and train the keystroke sample generator based on the user identification classification of the classifier and the text character length classification of the regressor; in a second training phase of training a user identification model, receive, via the communication interface, one or more second text input samples by a second user, said second user being different from the plurality of first users; generate, using the keystroke sample generator, a plurality of negative keystroke samples based on the one or more second text input samples; and train the user identification model on a user classification of the second user based on the one or more second text input samples and the generated plurality of negative keystroke samples; and in a deployment of the user identification model, receive, via the communication interface, a third text input sample in association with the second user; and authenticate the third text input sample using the trained user identification model.

According to one implementation, the user identification representation and the text sequence representation are generated using respective embedding neural layers.

According to one implementation, the user identification representation and the noise representation are generated to conform to a format of the text sequence representation using respective neural layers.

According to one implementation, the classifier is a multi-class discriminator embodied by a neural network and the regressor is a regression neural network.

According to one implementation, the training of the keystroke sample generator, the user identification classification by the classifier, and the text character length regression by the regressor are based on $$L(G,D,R,x,u,t) = L_{GAN}(G,D,x,u,t) + \lambda_1 \cdot L_{time}(G,u,t) + \lambda_2 \cdot L_{MSE}(G,R,x,t)$$

where:
G represents the keystroke sample generator,
D represents the multi-class discriminator,
R represents the regressor,
x represents an array of press and release timestamps for a typed text sequence of the received first text input sample,
t represents the typed text sequence of the received first text input sample,
u represents a one-hot encoded vector representing an ID associated with one of the plurality of first users that typed the received first text input sample or a label indicating that an input sample to the classifier is generated,
$\lambda_1$ is a hyperparameter that controls an importance of a temporal consistency loss,
$\lambda_2$ is a hyperparameter that controls an importance of a mean square error (MSE) loss with respect to the text character length of the generated keystroke sequence sample, $$L_{GAN}(G,D,x,u,t) = E_{x \sim p_{data}(x)}[-\sum_{i=1}^{k} u_i \cdot \log(D(x))] + E_{z \sim p_z(z)}[-\sum_{i=1}^{m} u_i \cdot \log(D(G(z|u,t)))]$$

E represents an expected value,
$p_{data}$ represents a probability distribution of data,
$p_z$ represents a noise distribution,
k represents a number of the plurality of first users, $$L_{time}(G,u,t) = E_{z \sim p_z(z)}[\sum_{i=1}^{n} \max(0, y_{i,0} - y_{i,1}) + \sum_{i=1}^{n-1} \max(0, y_{i,0} - y_{i+1,0})]$$

y=G (z| u, t), therefore $y_{i,0}$ and $y_{i,1}$ represent press and release timestamps of an i-th key in the sequence t,
n represents a sequence length, and $$L_{MSE}(G,R,x,t) = E_{x \sim p_{data}(x)}[(R(x) - len(t))^2] + E_{z \sim p_z(z)}[(R(G(z|u,t)) - len(t))^2].$$

According to one implementation, the plurality of negative keystroke samples are generated by the generator based on one or more of the plurality of first text input samples in association with one or more of the plurality of first users, which are different from the second user.

According to one implementation, at least one of the negative keystroke samples is generated based on one of the plurality of first text input samples that comprises a same character sequence as the one or more second text input samples.

According to one implementation, the user identification model is a binary classifier that determines whether a keystroke sequence of the third text input sample corresponds to the second user based on the user classification training.

According to one implementation, the plurality of first text input samples comprise free text inputs by the plurality of first users.

According to one implementation, the one or more second text input samples comprise a fixed text input by the second user.

In accordance with an example implementation of the present disclosure, a method for identifying a user based on keystroke dynamics of an input by the user, comprises: in a first training phase of training a keystroke sample generator, receiving, by a processing apparatus via a communication interface, a plurality of first text input samples by a plurality of first users; and for each received first text input sample: generating, by the processing apparatus, a user identification representation, a noise representation, and a text sequence representation of the received first text input sample; generating, by the processing apparatus using the keystroke sample generator, a keystroke sequence sample based on a combination of the generated user identification representation, noise representation, and text sequence representation; inputting, by the processing apparatus, the generated keystroke sequence sample and an actual keystroke sequence of the received first text input sample to a classifier for a user identification classification on the generated keystroke sequence sample; inputting, by the processing apparatus, the generated keystroke sequence sample and the actual keystroke sequence of the received first text input sample to a regressor for a text character length regression on the generated keystroke sequence sample; and training, by the processing apparatus, the keystroke sample generator based on the user identification classification of the classifier and the text character length classification of the regressor; in a second training phase of training a user identification model, receiving, by the processing apparatus via the communication interface, one or more second text input samples by a second user, said second user being different from the plurality of first users; generating, by the processing apparatus using the keystroke sample generator, a plurality of negative keystroke samples based on the one or more second text input samples; and training, by the processing apparatus, the user identification model on a user classification of the second user based on the one or more second text input samples and the generated plurality of negative keystroke samples; and in a deployment of the user identification model, receiving, by the processing apparatus via the communication interface, a third text input sample in association with the second user; and authenticating, by the processing apparatus, the third text input sample using the trained user identification model.

According to one implementation, the user identification representation and the text sequence representation are generated using respective embedding neural layers.

According to one implementation, the user identification representation and the noise representation are generated to conform to a format of the text sequence representation using respective neural layers.

According to one implementation, the classifier is a multi-class discriminator embodied by a neural network and the regressor is a regression neural network.

According to one implementation, the training of the keystroke sample generator, the user identification classification by the classifier, and the text character length regression by the regressor are based on $$L(G,D,R,x,u,t) = L_{GAN}(G,D,x,u,t) + \lambda_1 \cdot L_{time}(G,u,t) + \lambda_2 \cdot L_{MSE}(G,R,x,t)$$

where:
G represents the keystroke sample generator,
D represents the multi-class discriminator,
R represents the regressor,
x represents an array of press and release timestamps for a typed text sequence of the received first text input sample,
t represents the typed text sequence of the received first text input sample,
u represents a one-hot encoded vector representing an ID associated with one of the plurality of first users that typed the received first text input sample or a label indicating that an input sample to the classifier is generated,
$\lambda_1$ is a hyperparameter that controls an importance of a temporal consistency loss,
$\lambda_2$ is a hyperparameter that controls an importance of a mean square error (MSE) loss with respect to the text character length of the generated keystroke sequence sample, $$L_{GAN}(G,D,x,u,t) = E_{x \sim p_{data}(x)}[-\Sigma_{i=1}^{k} u_i \cdot \log(D(x))] + E_{z \sim p_z(z)}[-\Sigma_{i=1}^{m} u_i \cdot \log(D(G(z|u,t)))]$$

E represents an expected value,
$p_{data}$ represents a probability distribution of data,
$p_z$ represents a noise distribution,
k represents a number of the plurality of first users, $$L_{time}(G,u,t) = E_{z \sim p_z(z)}[\Sigma_{i=1}^{n} \max(0, y_{i,0} - y_{i,1}) + \Sigma_{i=1}^{n-1} \max(0, y_{i,0} - y_{i+1,0})]$$

y=G (z| u, t), therefore $y_{i,0}$ and $y_{i,1}$ represent press and release timestamps of an i-th key in the sequence t,
n represents a sequence length, and $$L_{MSE}(G,R,x,t) = E_{x \sim p_{data}(x)}[(R(x) - len(t))^2] + E_{z \sim p_z(z)}[(R(G(z|u,t)) - len(t))^2].$$

According to one implementation, the plurality of negative keystroke samples are generated by the generator based on one or more of the plurality of first text input samples in association with one or more of the plurality of first users, which are different from the second user.

According to one implementation, at least one of the negative keystroke samples is generated based on one of the plurality of first text input samples that comprises a same character sequence as the one or more second text input samples.

According to one implementation, the user identification model is a binary classifier that determines whether a keystroke sequence of the third text input sample corresponds to the second user based on the user classification training.

According to one implementation, the plurality of first text input samples comprise free text inputs by the plurality of first users.

According to one implementation, the one or more second text input samples comprise a fixed text input by the second user.

BRIEF DESCRIPTION OF THE DRAWINGS

Various example implementations of this disclosure will be described in detail, with reference to the following figures, wherein.

DETAILED DESCRIPTION

As an overview, the present disclosure generally concerns machine learning techniques for user identification based on keystroke dynamics. The following example implementation includes novel machine learning techniques the features of which may be incorporated into other types of entity identification or differentiation without departing from the spirit and the scope of the disclosure.

The problem of user identification based on keystroke dynamics could be naturally addressed with binary classification algorithms, where the task is to determine if a sequence of key press and release timestamps belongs to a particular user. When the system is implemented for fixed and user-specific inputs (such as usernames, passwords, e-mail addresses, etc.), the machine learning models need negative data samples during training, namely samples typed by other users with the fixed-text belonging to the target user. However, this approach is impractical in real-life scenarios because, for each new user enrolled in the system, it is not feasible or advisable to ask other users to type the user-specific inputs of the newly enrolled user (e.g., the new username or e-mail address) to acquire the negative data required to train the machine learning model.

To overcome this issue, the present disclosure describes a method based on a generative partner-adversarial network (GPAN) to automatically generate synthetic negative examples, which are passed to the user identification model. The disclosed GPAN generates press and release timestamps conditioned on a set of keystroke sequences generated by a set of existing users. The generator achieves its goal by learning a joint hidden representation of the users, the sequences of keys, and the noise vectors.

Figure 1:
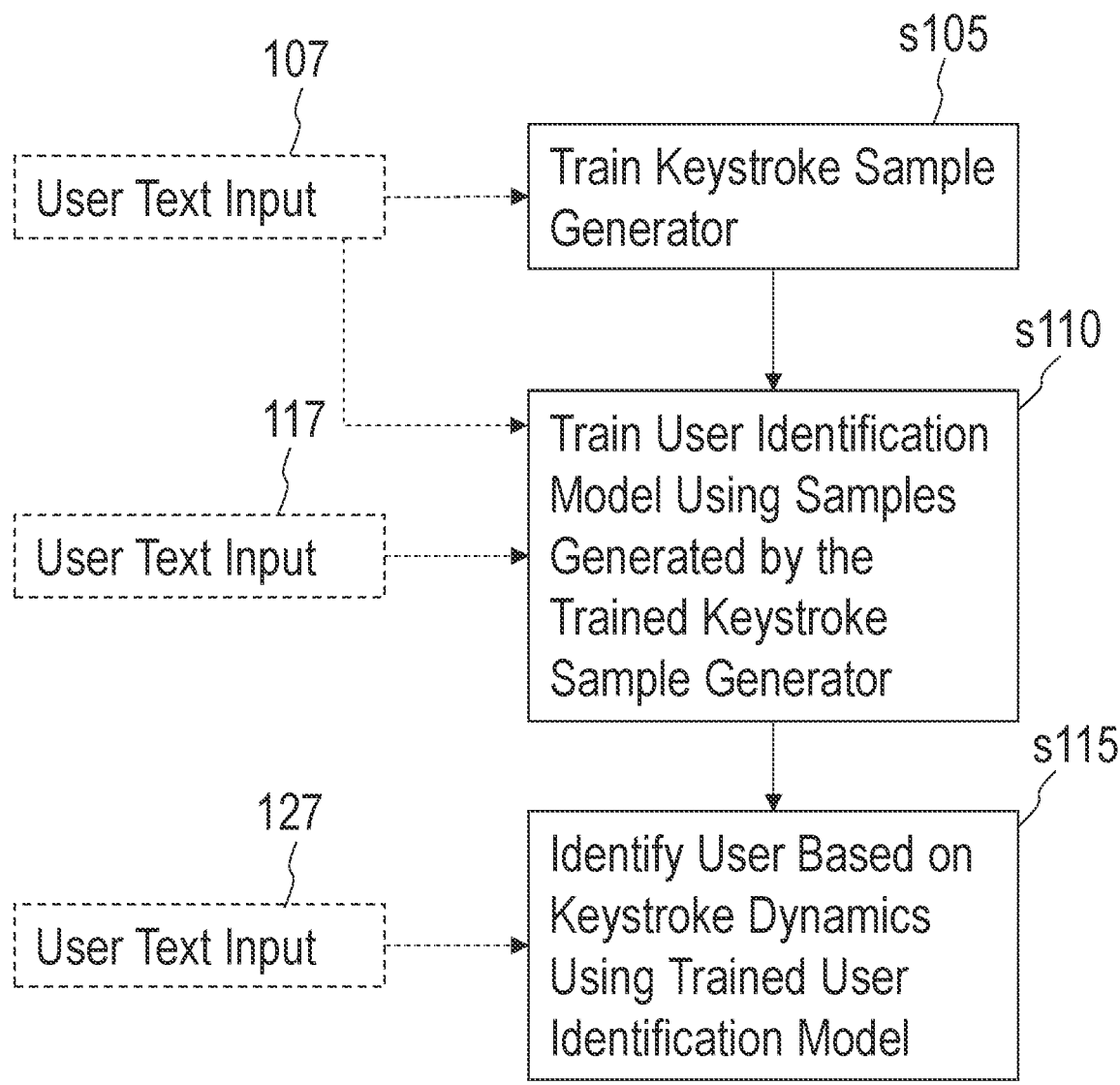
FIG. 1 is a flow diagram illustrating a process of training and deploying a user identification model for identifying users based on keystroke dynamics according to an example implementation of the present disclosure.

FIG. 1 is a flow diagram illustrating a process 100 of training and deploying a user identification model for identifying users based on keystroke dynamics according to an example implementation of the present disclosure.

As illustrated in FIG. 1, process 100 initiates with step s105 of training a keystroke sample generator representing a first training phase of process 100. According to one embodiment, the keystroke sample generator is a negative keystroke sample generative neural network using user free text input 107, which is obtained from a database (e.g., database 9345 of FIG. 9) of keystroke typing patterns for the free-text scenario. In embodiments, the keystroke typing patterns of user text input 107 can be gathered from users prior to initiating the training process 100 and recorded in the database (e.g., database 9345 of FIG. 9). Additionally, the user keystroke typing patterns can be collected on an ongoing real-time basis—for example, during user registration and/or authentication processes. In other embodiments, the user text input 107 can be obtained from users at one or more system training sessions, where users are prompted to provide text input sequences. Thus, in embodiments, user text input 107 can comprise free text inputs and/or fixed text inputs.

According to one embodiment, step s105 includes employing a generator that learns to produce keystroke samples for a given user ID and a text sequence, with the use of a random or pseudo-random noise vector as an input for the learning. The generated keystroke samples are compared with actual keystrokes of the text sequence of the user associated with the user ID by a multi-class discriminator (classifier) and a regressor. The regressor learns to predict the length of an input sequence, acting as a partner for the generator by helping the generator to produce keystroke sequences of the correct length. The multi-class classifier learns to distinguish between generated and actual keystroke samples, acting as an adversary for the generator by trying to exploit the generative patterns of the generator. Thus, the generator, the classifier, and the regressor form a GPAN architecture.

Upon adequately training the keystroke sample generator, processing 100 proceeds to step s110 of training a user identification model representing a second training phase of process 100. According to one embodiment, a binary classifier is trained on the user identification task, using both positive keystroke samples (collected from the genuine users) and negative keystroke samples (generated automatically by the generator that is trained at step s105). According to an exemplary embodiment and as illustrated in FIG. 1, the positive keystroke samples ("user text input 117") are randomly or pseudo-randomly sampled from the user input database (e.g., database(s) 9345 of FIG. 9) of keystroke typing patterns for the free-text scenario. In other embodiments, the positive keystroke samples ("user text input 117") can be obtained from users at one or more system training sessions, where users are prompted to provide text input sequences.

The binary classifier can be any machine learning model, including but not limited to dense neural networks, convolutional neural networks, transformers, random forests, Support Vector Machines, etc.

With adequate training of the user identification model using at least the generated negative keystroke samples, the binary classifier is deployed, at step s115, for identifying a user based on keystroke dynamics of received user text input 127. In other words, the binary classifier authenticates the received user text input 127 on whether it is genuinely from the associated user based on the keystroke dynamics. According to an exemplary embodiment of the present disclosure, the user text input 127 of step s115 is a real-time input from a user—for example, during a user authentication process. Based on the training step s110 using at least negative samples generated by the trained generator of step s105, the accuracy of the user identification performed at step s115 is significantly improved over conventional techniques.

First Training Phase (Step s105)

Figure 2:
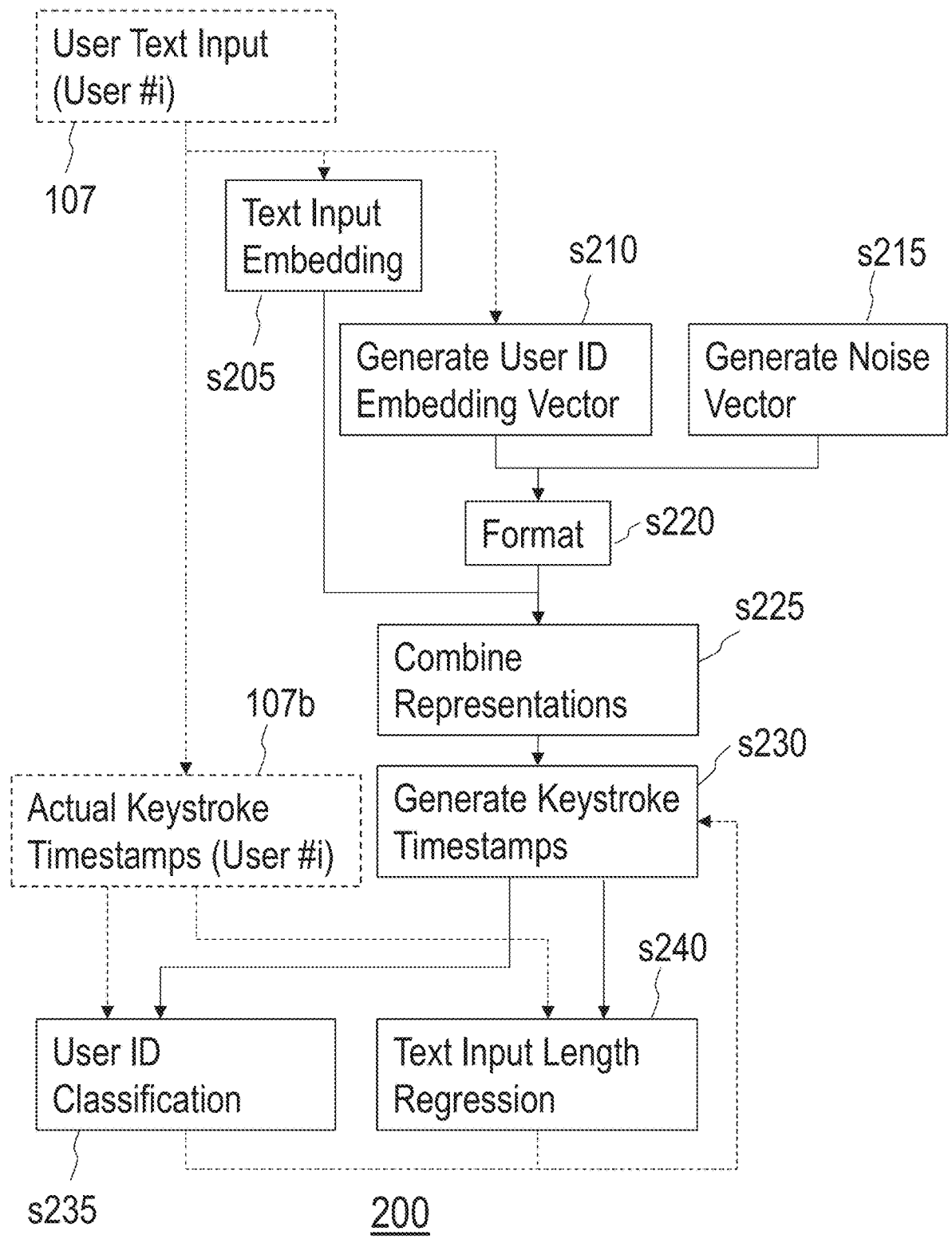
FIG. 2 is a flow diagram illustrating a process for a first training phase of training a keystroke sample generator according to an example implementation of the present disclosure.

FIG. 2 is a flow diagram illustrating a process 200 corresponding to step s105 according to an example implementation of the present disclosure.

As illustrated in FIG. 2, process 200 initiates with step s205 of generating a text input embedding representation based on user free text input 107. According to an example implementation of the present disclosure, process 200 is conducted by randomly or pseudo-randomly sampling user free text input 107 of a user (user #i) from a database (e.g., 9345 in FIG. 9) containing a collection of text input data (e.g., for #k users, #k being at least about 10) and corresponding user identification (user ID) associated with each piece of text input data. In an exemplary embodiment, the text input data and the sampled user free text input 107 for step s205 comprises a sequence of n number of characters typed by the user of sampled text input data (e.g., user #i). Next, a user ID embedding vector based on the user ID (user #i) associated with the sampled user free text input 107 is generated at step s210. Separately, a noise vector is generated at step s215. The user ID embedding vector generated at step 210 and the noise vector generated at step s215 are then formatted into representations, at step s220, that correspond with the format of the text input embedding representation generated at step s205.

The text input embedding representation is then combined, at step s225, with the formatted user ID embedding representation and formatted noise representation of step 220.

Process 200 then proceeds to step s230 of generating sample keystroke timestamps based on the combined representations of step s225. As illustrated in FIG. 2, the generated sample keystroke timestamps are used at step s235 with actual keystroke timestamps 107b (corresponding to sampled user #i from user free text input 107) for user ID classification as adversarial training for the keystroke sample generator of step s230. Additionally, the generated sample keystroke timestamps from step s230 are used at step s240 with the actual keystroke timestamps 107b for text input length regression as partner training for the keystroke sample generator of step s230. In certain embodiments, process 200 can be repeated for plural sampled users to continually train the keystroke sample generator. User free text input 107 can be obtained from each user—for example, via a registration process—and stored in a database for training the keystroke sample generator.

FIGS. 3-7 are schematic diagrams illustrating the data and network structures of an overall GPAN architecture for performing process 200 shown in FIG. 2 according to one example implementation of the present disclosure. As described with reference to FIG. 2, process 200 is conducted by randomly sampling triplets formed of: a) a text sequence of n characters (step s205) and b) a user ID (s210) corresponding to the user that provided the text sequence as input from an existing data set of keystroke samples produced by an established set of users, along with c) a noise vector (step s215).

Figure 3:
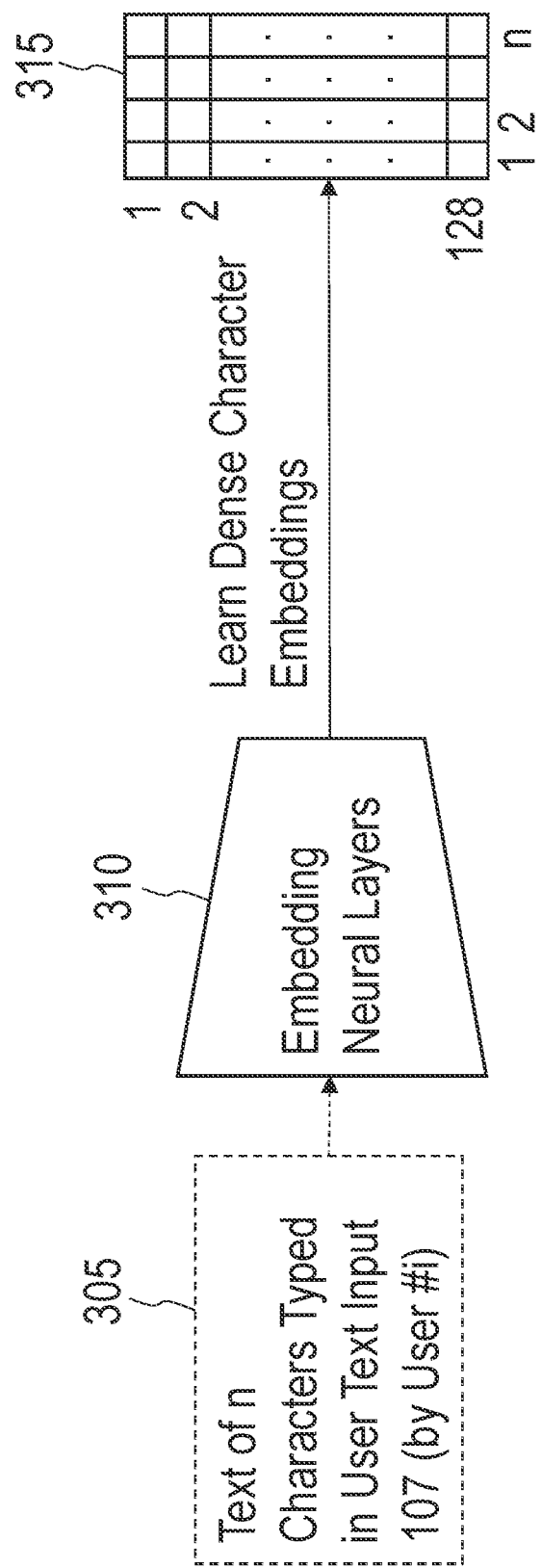
FIG. 3 is a diagram providing a schematic illustration of the data and network structures for conducting text input embedding according to an example implementation of the present disclosure.

FIG. 3 is a schematic illustration of the data and network structures for performing step s205 shown in FIG. 2 of text input embedding according to an example implementation of the present disclosure.

As illustrated in FIG. 3, an embedding vector for each typed character in a text sequence (a string of n number of characters typed by a user (e.g., user #i)) and the corresponding timestamps for each key press and key release event 305 of the user's text input 107 is learned via embedding neural layers 310. According to an exemplary embodiment, the embedding neural layers 310 are fully connected (dense) neural layers to learn dense character embeddings, resulting in a representation 315 for the n characters in the sampled user text input 107. As illustrated in FIG. 3, representation 315 is in the form of a 128-dimensional vector for each of the n characters, which vectors are embodied in a matrix (e.g., a 128-by-n matrix) representing the sampled sequence of n characters 305 of the user text input 107.

Figure 4:
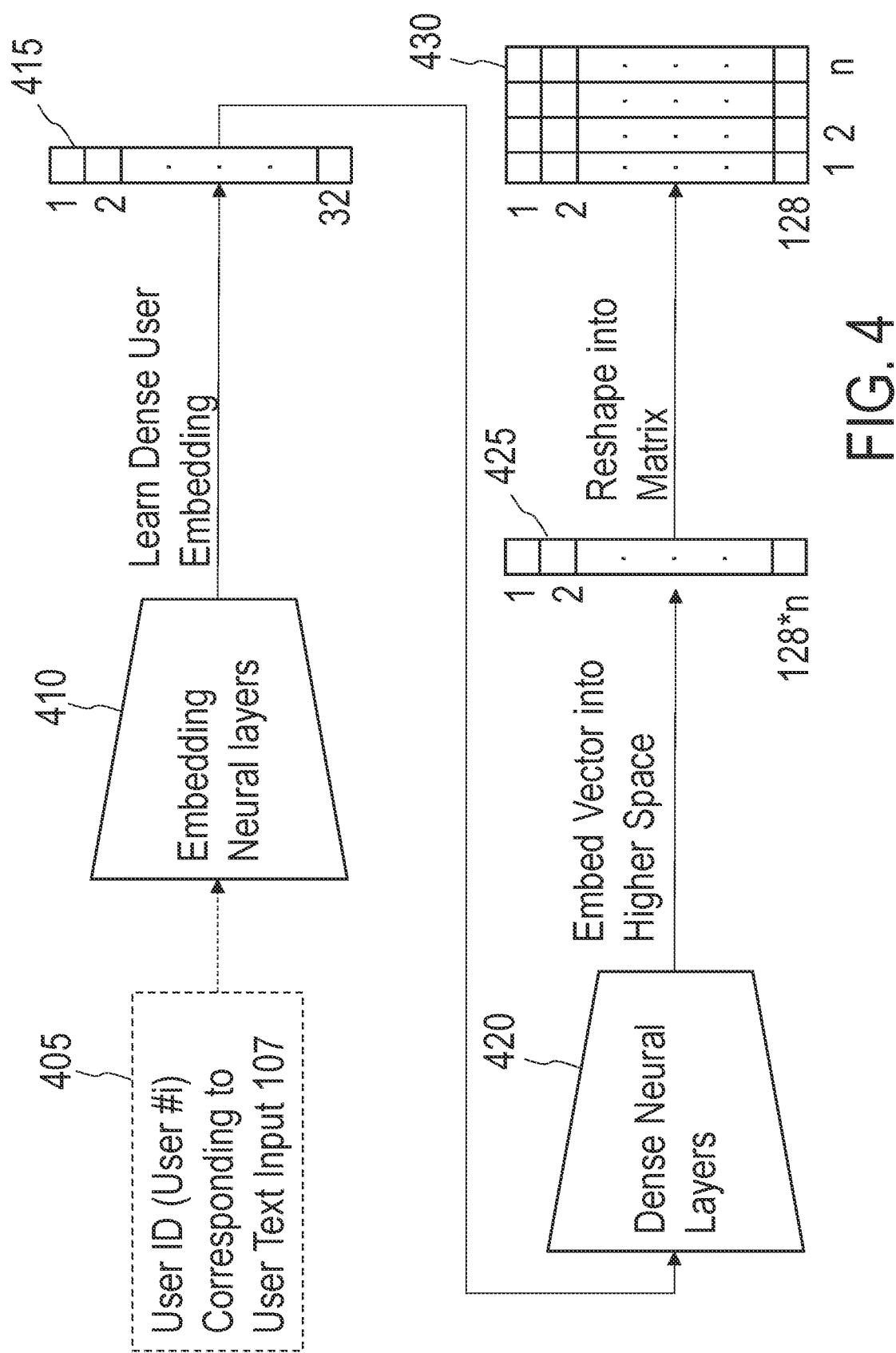
FIG. 4 is a diagram providing a schematic illustration of the data and network structures for generating a user ID embedding vector according to one example implementation of the present disclosure.

FIG. 4 is a schematic illustration of the data and network structures for performing step s210 shown in FIG. 2 of generating a user ID embedding vector according to one example implementation of the present disclosure.

As shown in FIG. 4, an embedding vector is learned for each input user (e.g., user ID for user #i—e.g., between #1, #2, . . . , #k) 405 associated with each corresponding text sequence 305 via embedding neural layers 410. In an exemplary embodiment, fully connected (dense) neural layers are employed for embedding neural layers 410 and the resulting user embedding vector 415 is a 32-dimensional vector. The user embedding vector 415 is passed through another set of dense neural layers 420 to further embed the user embedding vector 415 into the higher space where the representation 315 (e.g., a 128-by-n matrix) for the text sequence resides. According to one embodiment, the dense neural layers 420 output a 128*n dimensional vector 425 that is then reshaped into a 128-by-n matrix 430—for example, by a mathematical operator (not shown)—to conform to the format of representation 315. The operations of dense neural layers 420 and the reshaping of vector 425 to matrix 430 represent an example implementation of step s220 of process 200 shown in FIG. 2.

Figure 5:
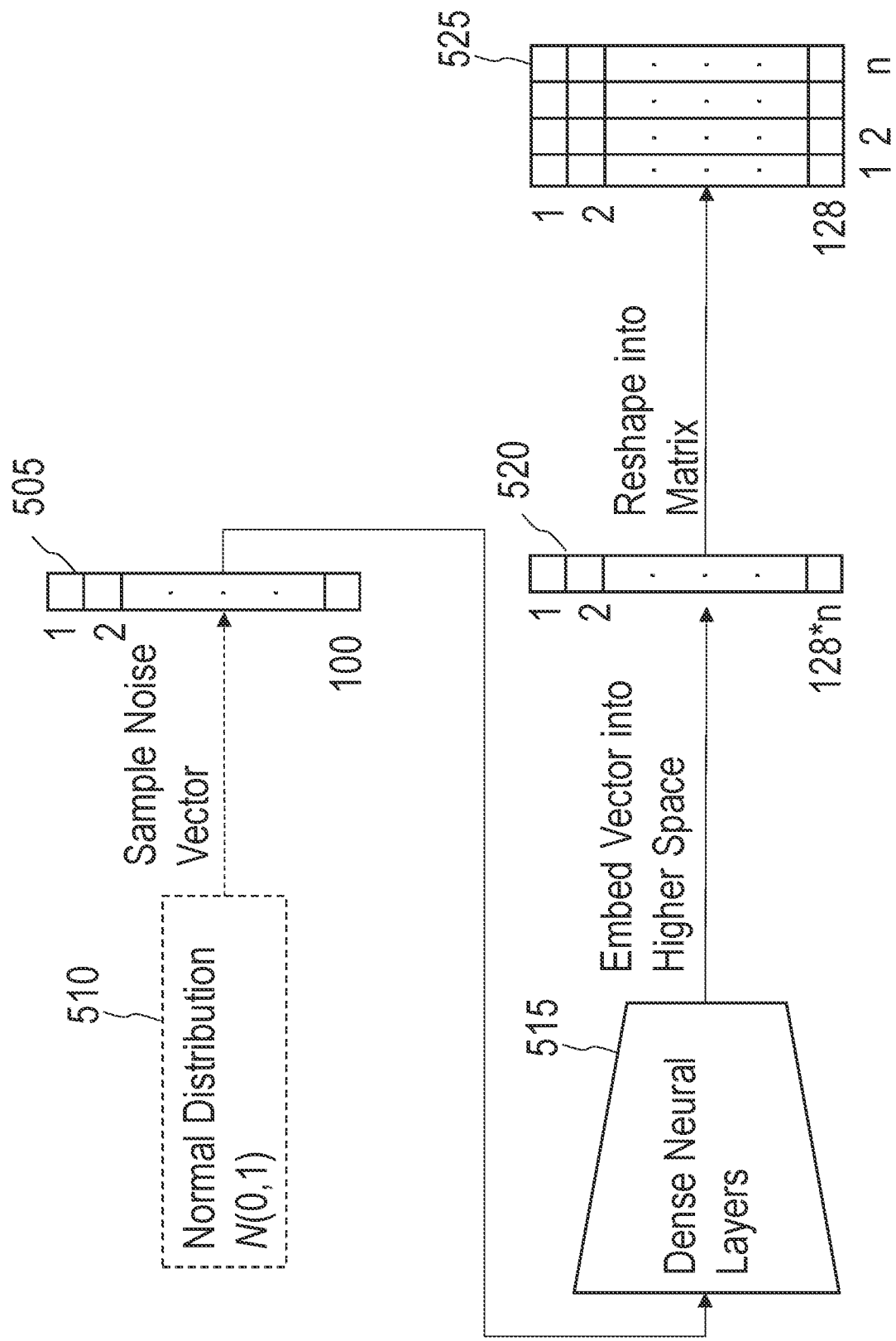
FIG. 5 is a diagram providing a schematic illustration of the data and network structures for generating a noise vector in accordance with an example implementation of the present disclosure.

FIG. 5 is a schematic illustration of the data and network structures for performing step s215 shown in FIG. 2 of generating a noise vector in accordance with an example implementation of the present disclosure.

As illustrated in FIG. 5, a noise vector (e.g., a 100-dimensional vector) 505 is randomly or pseudo-randomly sampled from a standard normal distribution (with mean 0 and standard deviation 1) 510 for each corresponding text sequence 305 and associated user 405. In embodiments, the noise vector 505 can be generated using a random or pseudo random number generator (not shown). The random or pseudo-random noise vector 505 enables the generation of diverse timestamps for a certain user ID (e.g., user #i of representation 430) and corresponding text sequence (e.g., representation 315). The noise vector 505 is passed through another set of dense neural layers 515 to further embed the noise vector 505 into the higher space where the representation 315 (e.g., a 128-by-n matrix) for the text sequence resides. According to one embodiment, the dense neural layers 515 output a 128*n dimensional vector 520 that is then reshaped into a 128-by-n matrix 525—for example, by a mathematical operator (not shown)—to conform to the format of representation 315. The operations of dense neural layers 515 and the reshaping of vector 520 to matrix 525 represent an example implementation of step s220 of process 200 shown in FIG. 2.

Thus, before going into the generator for generating keystroke samples, the user ID and the text sequence are encoded into dense vectors by neural embedding layers. The user ID and the random noise vector are passed through dense neural layers, such that the resulting embedding vectors reach the desired dimension, for example 128*n, where n is the number of characters in the input text sequence. The resulting embedding vectors are further reshaped into matrices and concatenated with the character embeddings into a single matrix of 384 (128*3) rows and n columns. The resulting matrix represents the input of the generative neural network.

Figure 6:
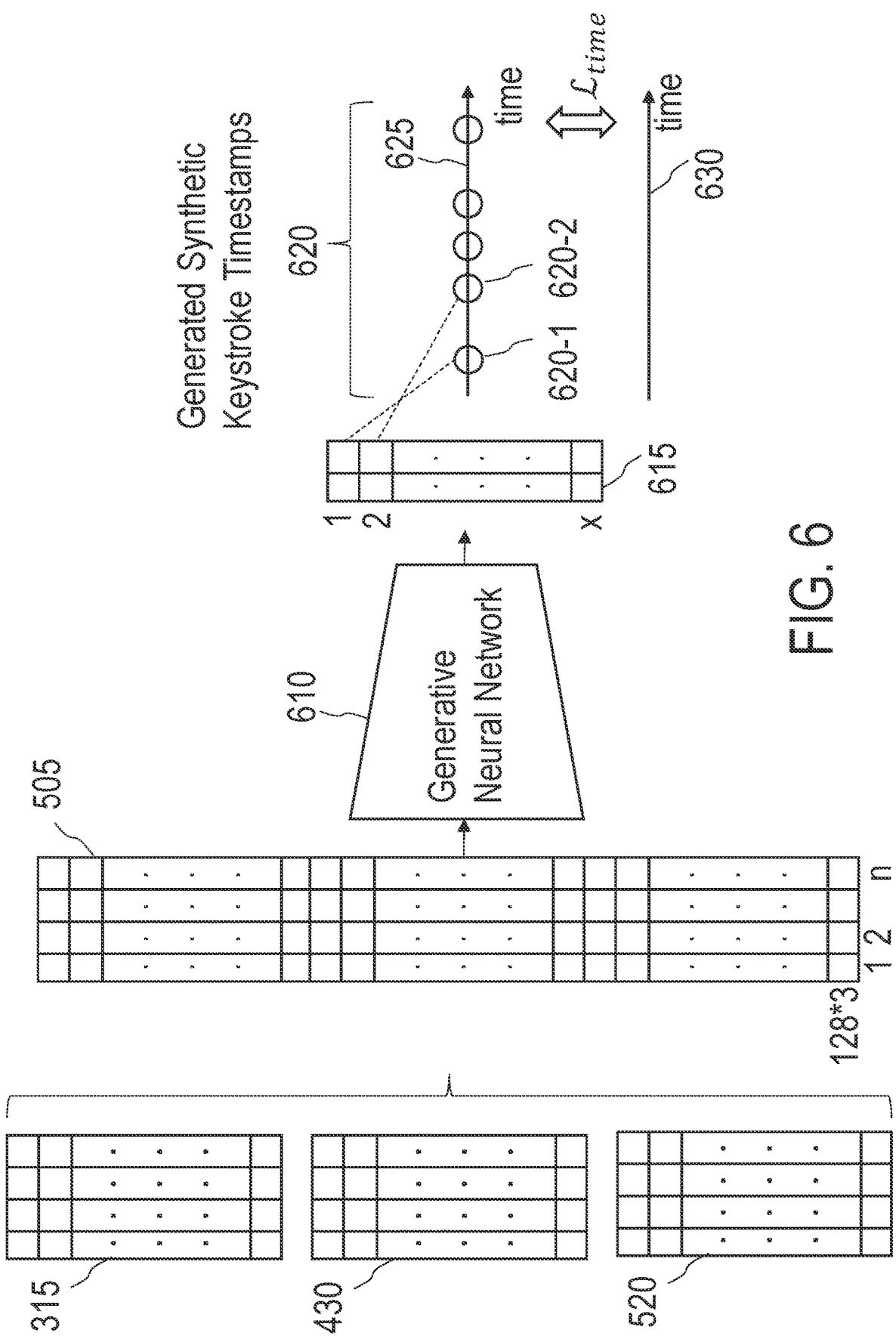
FIG. 6 is a diagram providing a schematic illustration of the data and network structures for combining the text input sequence, user ID, and noise vector representations of FIGS. 3-5 and generating keystroke timestamps according to an example implementation of the present disclosure.

FIG. 6 is a schematic illustration of the data and network structures for performing step s225 shown in FIG. 2 of combining the text sequence, user ID, and noise vector representations and step s230 of generating keystroke timestamps according to an example implementation of the present disclosure.

As shown in FIG. 6, the resulting representations of the user (430), the sequence of keys/characters (315), and the noise vector (520) are concatenated into a single matrix 605 and propagated further through a generator (e.g., generative neural network) 610. This corresponds to step s225 of combining representations shown in FIG. 2 and is an example implementation thereof.

The generator (e.g., generative neural network) 610 implements step s230 of generating keystroke timestamps and yields a 2D array (matrix) 615 as output, where the i-th row contains the press and release timestamps (two values) for the i-th typed key/character of a predicted sequence. As illustrated in FIG. 6, matrix 615 representing the generated keystroke timestamps includes x rows, which is a predicted length of the actual n character text sequence of user text input 107. Element 620 is a conceptual illustration of keystrokes 620-1 and 620-2, among others, on a timeline 625 corresponding to the values (not shown) on the first and second rows, among others, of matrix 615, respectively. FIG. 6 further provides a conceptual illustration of $L_{time}$, which is the loss that penalizes the output of the generator

610 (e.g., generated timestamps 620) when it breaks the time constraints of a temporal sequence 630. $L_{time}$ is described in further detail below with reference to equation (3).

Figure 7:
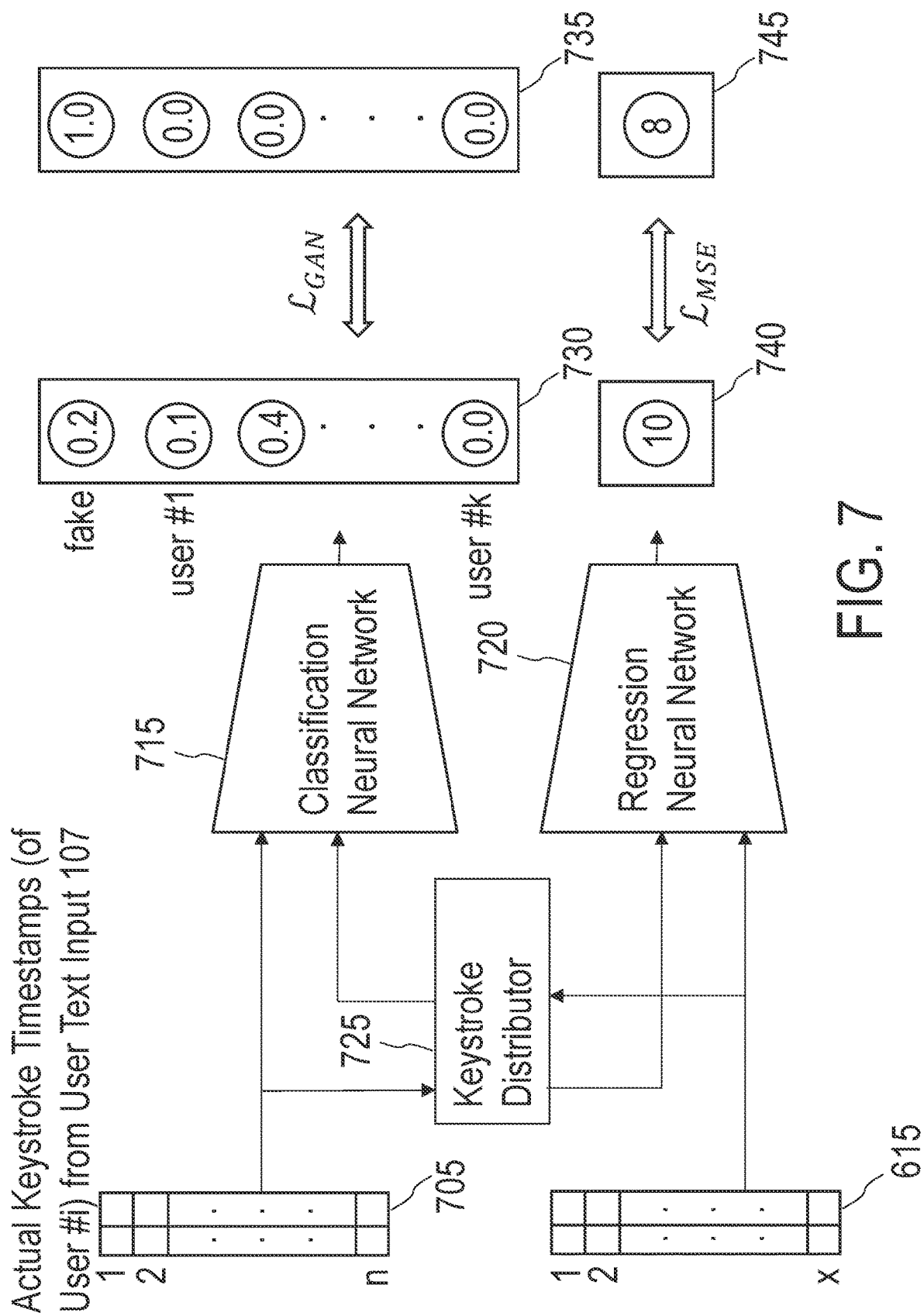
FIG. 7 is a diagram providing a schematic illustration of the data and network structures for conducting user ID classification and regression training based on generated keystroke timestamps of FIG. 6 according to an example implementation of the present disclosure.

FIG. 7 is a schematic illustration of the data and network structures for performing steps s230 and 235 shown in FIG. 2 of conducting user ID classification and regression training based on generated keystroke timestamps according to an example implementation of the present disclosure.

As shown in FIG. 7, the generated timestamps 615 together with the real actual sequence of timestamps 705 by the user (e.g., user #i) typing the sampled text (user text input 107) are further processed by a multi-class discriminator (e.g., a classification neural network) 715 and a regressor (e.g., a regression neural network) 720. The discriminator (D) 715 is a multi-class classifier predicting whether the given input is genuine (real) or fake (synthetic). It classifies the genuine samples into different classes, according to the user ID. The regressor (R) 720 executes a regression task. It receives the same input as the discriminator 715 and learns to predict the length of the character sequence, helping the generator (e.g., generative neural network 610) to generate keystroke sequences of the correct length (e.g., x=n). As illustrated in FIG. 7, in an example implementation, a keystroke distributor 725 is incorporated for matching inputs to the discriminator 715 and regressor 720 between generated timestamps 615 outputted from the generator 610 and the actual keystroke timestamps 705 obtained from user text input 107.

Element 730 is a conceptual illustration of predicted labels by discriminator 715 for an input (e.g., users #1 . . . #k or "fake" for generated keystroke timestamps). FIG. 7 further provides a conceptual illustration of $L_{GAN}$, which is the cross-entropy loss against ground-truth (correct) labels 735 for the input that enables the generator (610) to produce timestamps specific to a user and a sequence of keys/characters. $L_{GAN}$ is described in further detail below with reference to equation (2). Element 740 is a conceptual illustration of the character length predicted by regressor 720 based on the timestamp sample 615 generated by generator 610. FIG. 7 further provides a conceptual illustration of $L_{MSE}$, which is the mean squared error enforcing the generated sample 615 to have the same length as the initial text sequence 305 given as input—e.g., the ground-truth actual character length 745 of sequence 305. $L_{MSE}$ is described in further detail below with reference to equation (4).

According to an exemplary embodiment of the present disclosure, the generator 610, the discriminator 715, and the regressor 720 are neural networks organized into sequential layers of artificial neurons (not shown). In embodiments, generator 610, discriminator 715, and regressor 720 can each be any machine learning model, including but not limited to dense neural networks, convolutional neural networks, transformers, etc. The information through a neural network is usually propagated in one direction, from the input layer, through the hidden layers and to the output layer (not shown). In one embodiment of the present disclosure, the generator 610, the discriminator 715, and the regressor 720 are convolutional neural networks. Convolutional neural networks are a particular type of neural networks that are designed to efficiently process images (or 2D arrays) using a special kind of layer inspired by the human visual cortex, namely the convolutional layer. In another embodiment of the present disclosure, the generator 610, the discriminator 715. and the regressor 720 incorporate transformer architectures. Transformers represent a type of neural networks that employ multi-head self-attention to learn how distant elements, e.g., pixels or image patches, influence each other. In another embodiment of the present disclosure, the generator 610, the discriminator 715, and the regressor 720 are recurrent neural networks. Recurrent neural networks use feedback connections to learn from sequences of data, being capable of finding long-term dependencies inside given input sequences.

Regardless of the architecture type, in embodiments, the neural networks (610, 715, and/or 720) can be trained by using stochastic gradient descent (SGD) or other variants of the gradient descent algorithm to minimize some loss function. The training process is based on alternating two steps, a forward pass and backward pass, until the model's prediction error is sufficiently low. The forward pass consists of passing the training data through the model in order to generate some output or predict some class labels. In the backward pass, the error given by the current predictions is used to update the model in order to improve the model and reduce its error. To update the model's weights, the errors are backpropagated through the network. After several iterations (epochs) (e.g., 100) over the training data, the algorithm is supposed to find the model's weights that minimize the prediction error on the training set. This is done by making small adjustments to the model's weights that move it along the gradient (slope) of the loss function down towards a minimum error value. This gives the optimization algorithm its name of gradient descent.

In embodiments, to train the whole GPAN architecture illustrated in FIGS. 3-7, any gradient-based backpropagation algorithm can be employed, such as SGD (Stochastic Gradient Descent), SGD with momentum, Adam, AdamW, etc. To avoid high memory usage, the optimization algorithm can be applied on mini batches (small subsets) of data samples. To optimize the disclosed GPAN model, a novel loss function is defined by equation (1) as follows, elements of which are illustrated in FIGS. 6 and 7:

$$L(G,D,R,x,u,t)=L_{GAN}(G,D,x,u,t)+\lambda_1 \cdot L_{time}(G,u,t)+ \lambda_2 \cdot L_{MSE}(G,R,x,t) \quad (1)$$

where:

G represents the generator (610),

D represents the multi-class discriminator (715),

R represents the regressor (720), x represents the array of press and release timestamps for a typed text sequence (615), t represents s a typed text sequence, u represents a one-hot encoded vector representing the ID associated with the user that typed the text or a label indicating that the input sample is generated ("fake"), $\lambda_1$ represents a hyperparameter that controls the importance of the temporal consistency loss, $\lambda_2$ represents a hyperparameter that controls the importance of the mean square error (MSE) loss with respect to the generated keystroke sequence length.

$L_{GAN}$ (FIG. 7) is the cross-entropy loss that enables the generator (610) to produce timestamps specific to a user u and a sequence of keys/characters t, which is defined by equation (2) as follows:

$$L_{GAN}(G,D,x,u,t)=E_{x \sim p_{data}(x)}[-\Sigma_{i=1}^{k} u_i \cdot \log(D(x))]+ E_{z \sim p_z(z)}[-\Sigma_{i=1}^{m} u_i \cdot \log(D(G(z\ u,t)))] \quad (2)$$

where:

E represents the expected value, $p_{data}$ represents the probability distribution of the data, $p_z$ represents the noise distribution, k represents the number of users, As illustrated in FIG. 7, $L_{GAN}$ accounts for the loss from the ground-truth (correct) label for the user (e.g., user #i)

735 associated with the text sequence 305 (from user text input 107) that forms the basis for the generated sequence 615 and the identified user 730 of the generated sequence 615 by the discriminator 715. Concurrently, discriminator 715 is trained to recognize "fake" generated text sequences by the generator 610.

$L_{time}$ (FIG. 6) is the loss that penalizes the output of the generator 610 when it breaks the time constraints of a temporal sequence 630, namely: (i) the press timestamp must be before the release timestamp for the same key, and (ii) two consecutive presses must be in chronological order. The temporal consistency loss is defined by equation (3) as follows:

$$L_{time}(G,u,t) = E_{z \sim p_z(z)}[\Sigma_{i=1}^{n} \max(0, y_{i,0} - y_{i,1}) + \Sigma_{i=1}^{n-1} \max(0, y_{i,0} - y_{i+1,0})] \quad (3)$$

where:
y=G(z| u, t), therefore $y_{i,0}$ and $y_{i,1}$ represent the press and the release timestamps of the i-th key in the sequence t,
n represents the sequence length.
$L_{MSE}$ is the mean squared error enforcing the generated sample to have the same length as the initial text sequence t given as input. The length consistency loss is defined by equation (4) as follows:

$$L_{MSE}(G,R,x,t) = E_{x \sim p_{data}(x)}[(R(x) - len(t))^2] + E_{z \sim p_z(z)}[(R(G(z|u,t)) - len(t))^2] \quad (4)$$

As illustrated in FIG. 7, $L_{GAN}$ accounts for the loss from the ground-truth (correct) label for the user (e.g., user #i) 735 associated with the text sequence (from user text input 107) that forms the basis for the generated sequence and the identified user 730 of the generated sequence by the discriminator 715.

Figure 9:
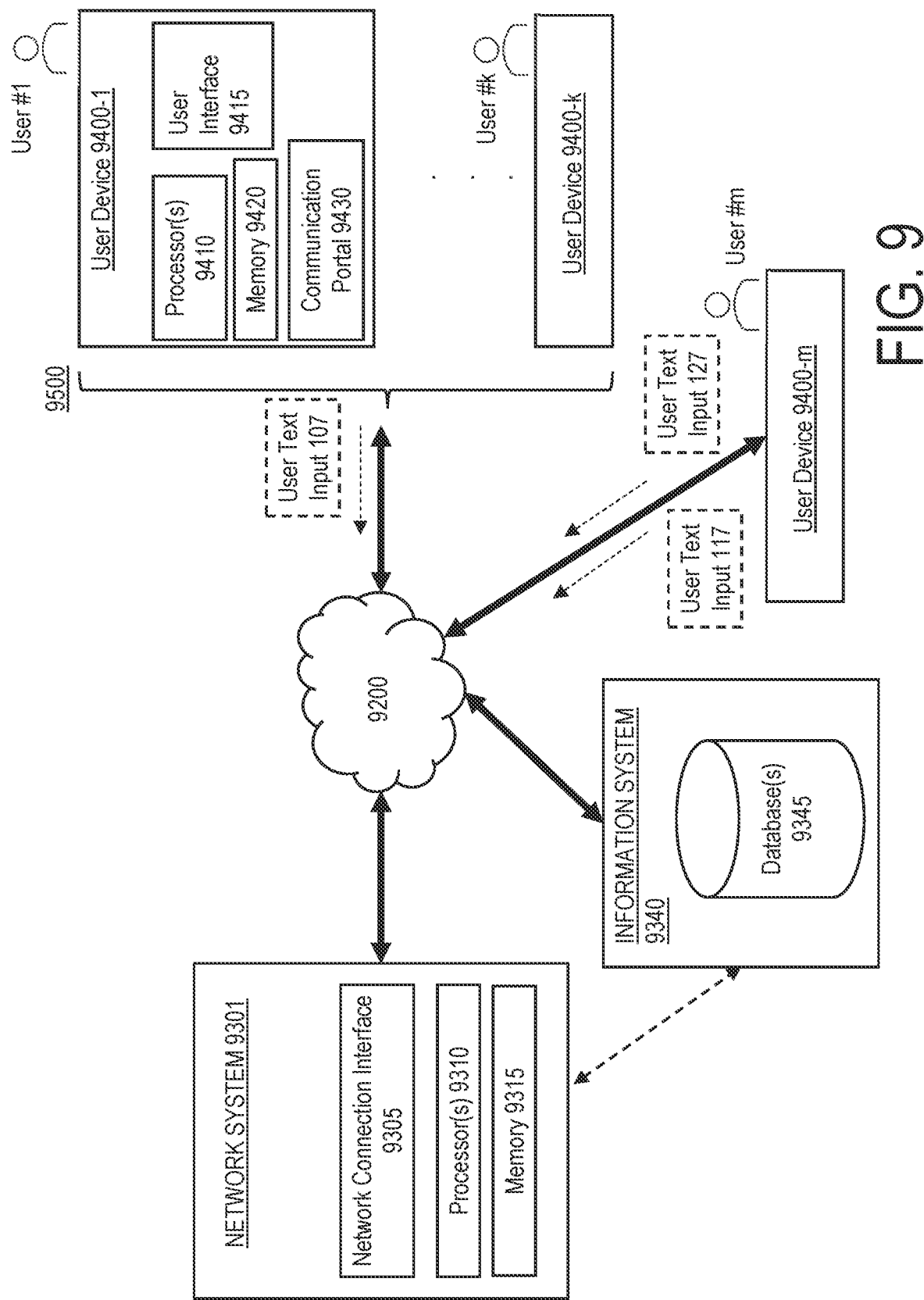
FIG. 9 is a schematic diagram of a system for implementing the user identification process based on keystroke dynamics according to an exemplary embodiment of the present disclosure.

To validate the disclosed GPAN architecture and method for the first training phase (step s105) in a practical scenario, the architecture is trained on a data set of 100+ users (#k>100) who provide thousands of free text samples (e.g., stored in database(s) 9345 of FIG. 9). In general, it is preferable to train the GPAN architecture on free text samples (user text input 107) to enable the learning of generic patterns that can be later employed in generating text samples for any user. Although the text samples of a particular user can be based on a fixed text, e.g., their username, it is preferable that the system and method have the capability of generating any text because users are not necessarily known a priori.

According to an example implementation of the present disclosure, to accommodate the typically short size of fixed text samples (usernames, e-mail address, passwords, etc.), the GPAN architecture is provided with short text sequences (and corresponding keystroke timestamps) (e.g., user text input 107) that are cropped out (extracted) from the free text examples (e.g., from database(s) 9345 of FIG. 9), reaching lengths ranging between 5 and 20 keys. Next, the resulting short text sequences are grouped into three clusters of respective length intervals: [5, 10), [10, 15) and [15, 20]. According to one example implementation, with the assumption that shorter sequences are easier to generate, the training process of step s105 (described with reference to FIGS. 2-7) is performed in ordered iterations from the cluster of text sequences with the shortest lengths (e.g., [5, 10)) to the cluster with the longest lengths (e.g., [15, 20]). This procedure is based on curriculum learning, which is a training procedure that first organizes the examples in their increasing order of difficulty, then starts the training of the neural network on the easiest examples, gradually adding increasingly more difficult examples along the way, until all training examples are fed to the network. The success of this approach relies on avoiding forced learning of very difficult examples right from the beginning—instead, guiding the model on the right path through the imposed curriculum. Curriculum learning is an approach proposed in "Bengio, Y., Louradour, J., Collobert, R., Weston, J.: *Curriculum Learning. In: International Conference on Machine Learning*, pp. 41-48, 2009" to better train neural networks by mimicking how humans learn, from easy to difficult.

To train the disclosed GPAN architecture, curriculum learning is applied on the three groups of text sequence as follows according to one implementation of the present disclosure.

The optimization is first conducted on the first group (text sequences of less than 10 characters in length) for a number of iterations. Then, the second group of data samples is added and the optimization continues on text sequences of less than 15 characters in length (this includes the first group). Finally, the last group of data samples is added and the optimization continues until convergence is reached. It is thus considered that longer sequences are more difficult to generate. Accordingly, the training of generator 610 is significantly improved via the curriculum learning procedure.

In summary, in the first training phase, the GPAN architecture alternates between two training steps. On the one hand, the generative neural network (generator) 610 learns to generate keystroke samples that deceive the multi-class classifier 715. At the same time, the generator 610 is penalized if it does not help the regressor 720 predict the correct keystroke sample length. Hence, the generator 610 and the regressor 720 are partners having the same training objective. Moreover, the generator 610 uses an additional temporal consistency loss (e.g., $L_{time}$) to ensure that the generated samples are temporally coherent. On the other hand, the multi-class classifier 715 is trained to classify keystroke samples into classes representing distinct users or the fake class representing keystroke samples generated by the generator 610. Hence, the generator 610 and the multi-class classifier 715 are adversaries having opposing training objectives.

Second Training Phase (Step s110)

After training the GPAN framework for generating keystroke samples, the generator 610 is employed to generate negative examples for training the user identification model.

With reference back to FIG. 1, process 100 proceeds to step s110 representing the second training phase after keystroke sample generator 610 is adequately trained. In the second training phase, a binary user identification model is trained on positive keystroke timestamps from actual users (user text input 117) and negative keystroke timestamps (generated by generator 610 and/or user text input 107 by another user).

Figure 8:
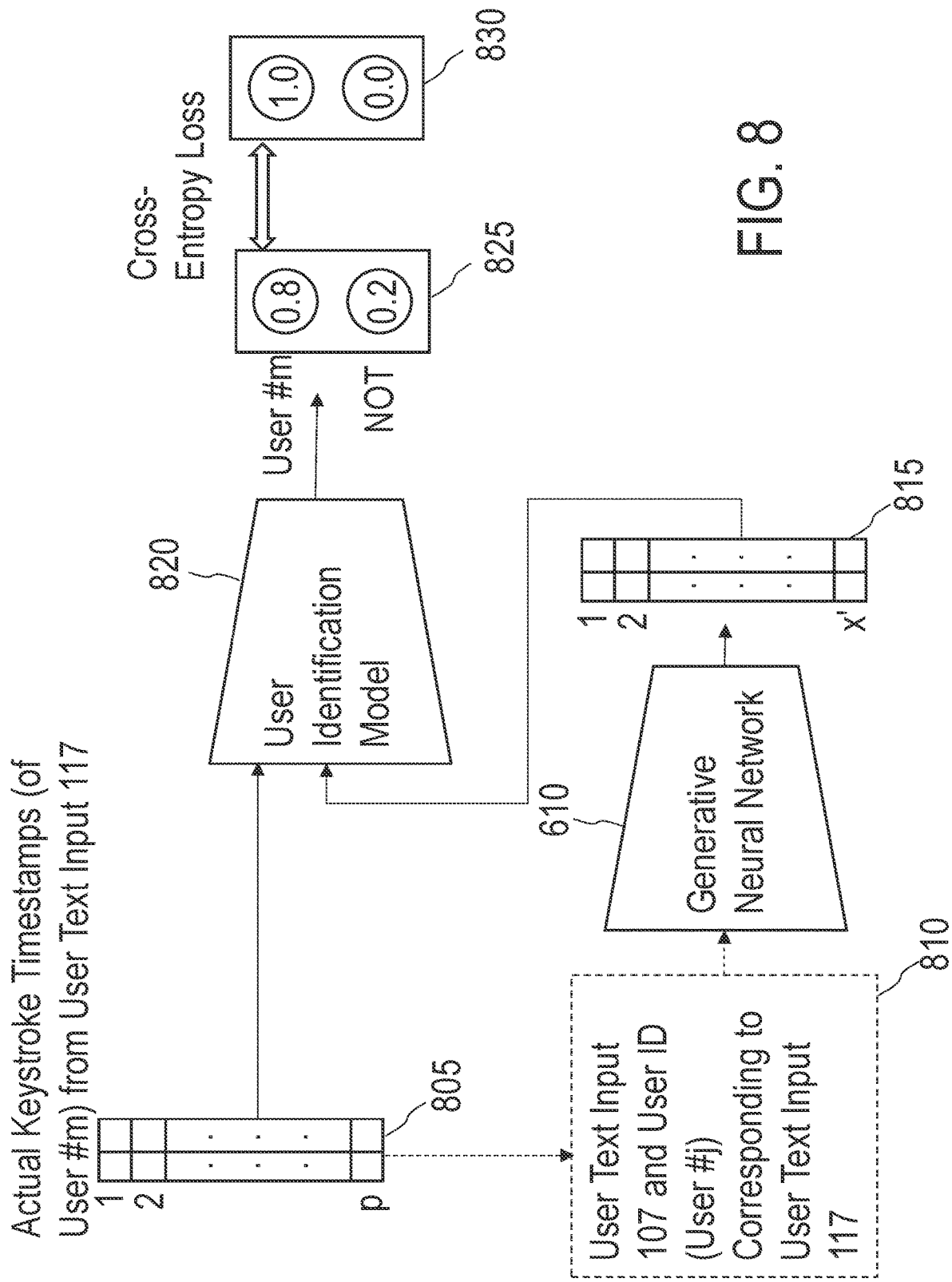
FIG. 8 is a diagram providing a schematic illustration of the data and network structures for training a user identification model based on generated keystroke samples by the trained generator of FIGS. 6 and 7 according to an exemplary embodiment of the present disclosure.

FIG. 8 is schematic illustration of the data and network structures for implementing step s110 according to an exemplary embodiment of the present disclosure.

As illustrated in FIG. 8, for the second training phase, an input example 805 is a matrix with the same number of rows as the number of keystrokes (e.g., p number of keys/characters) by the user (e.g., user #m), and two columns. For each keystroke, the matrix records the timestamps of the key press and key release events on the corresponding row. In an example implementation, a positive training example is collected each time the target user (user #m) types a pre-established text, for example their username or password (e.g., user text input 117). The negative training samples 815 are automatically generated by the disclosed GPAN architecture (e.g., generator 610), simulating the typing behavior of a user (with ID #1, #2, . . . , #k) (e.g., user #j) from the existing database of users (e.g., database 9345 of FIG. 9) for the text typed by the target user (user #m). According to one embodiment, user #m does not belong to the existing database of users used in the first training phase.

Thus, as illustrated in FIG. 8, the user text input (107) by a user (e.g., user #j) having inputted the text sequence (user text input 117) by the target user (user #m) and the associated user ID (e.g., of user #j) are retrieved based on the text sequence (user text input 117) by the target user as inputs 810 for generating a negative sample 815 by generator (e.g., generative neural network) 610. The inputs 810 correspond to inputs 305 and 405 shown in FIGS. 3 and 4 for the operations of generator 610 as described above in the manner of the first training phase with reference to FIGS. 3-6. For example, to generate a negative sample for the training procedure of the user identification model 820, a user ID is randomly or pseudo-randomly selected from the existing pool of user IDs (e.g., #1, #2, . . . , #k) used for training the GPAN architecture (or generator 610). In an exemplary embodiment, the user text input 117 of the target user (e.g., user #m) is a fixed text input and is transformed into a sequence of character tokens. In correspondence with the operations of the first training phase, a noise vector is generated (e.g., as described with reference to FIG. 5) to ensure variety of data samples. The resulting inputs 810 are passed to the generator 610, producing press and release timestamps specific to the randomly, or pseudo-randomly, selected user (e.g., user #j) from the pool of existing users (e.g., #1, #2, . . . , #k). Again, according to an exemplary embodiment, the target user (e.g., user #m) is not included in the pool of existing users (e.g., #1, #2, . . . , #k) which are used to train GPAN in the first training phase. Hence, target users are new users, not seen by the GPAN architecture.

The positive and negative training samples 805 and 815 are inputted to the user identification model 820 for training to recognize the target user (e.g., user #m).

As illustrated in FIG. 8, user identification model 820 is a binary classifier that outputs predicted positive and negative labels 825. The positive label ("User #m") predicts that a timestamp sample belongs to the user (e.g., user #m) and the negative label ("NOT" user #m) predicts that the timestamp sample does not belong to the user. According to one exemplary embodiment, a cross-entropy loss against the ground-truth actual labels 830 for each timestamp sample (positive or negative) is used for training the user identification model 820.

Additionally, in certain embodiments, real negative training samples from other users—for example, while they are typing their own (distinct) text sequences—can be obtained and inputted (not shown) to the binary user identification model 820 in place of, or in addition to, negative training samples 815.

After training the binary user identification model 820, the model can further be used to determine if a new keystroke timestamp sample belongs to the target user (e.g., user #m) or not.

Accordingly, for each target user that needs to be identified via keystroke dynamics, a training data set is constructed by collecting real examples of keystroke timestamps (e.g., 805), produced by the respective target user. The examples are labeled as positive. To enable the training of one or more binary classification model (820) that are aimed at recognizing the target user versus impostors, simulated keystroke timestamps (e.g., 815) generated by the disclosed GPAN architecture (e.g., generator 610) are added to the training set. The simulated examples are assigned negative labels.

In one embodiment of the present disclosure, the binary classifier 820 is a single machine learning model, such as a decision tree, a random forest classifier, a neural network, a logistic regression model, a Support Vector Machines model, and the like. In another embodiment of the present disclosure, the binary classifier 820 is an ensemble of multiple binary classifiers that are combined in one of various ways, such as plurality voting, classifier stacking, bagging, etc. Regardless of the kind of machine learning model, the binary classifier 820 incorporates data preprocessing, data normalization, feature extraction, feature selection, as well as other steps required to obtain a complete and fully operational machine learning system, as understood by those knowledgeable in the art. The machine learning model is trained by optimizing some objective or loss function on the constructed training set.

Upon training the binary classifier 820 that performs user identification, the model can be deployed in any software application and computing environment to identify the target user. In other words, with reference back to FIG. 1, process 100 proceeds to step s115 where user identification model (or binary classifier) 820 is deployed for identifying any user based on their user text input 127. According to one example implementation, the whole process 100 is repeated for each target user, i.e., the software application stores and employs a distinct binary classifier (820) for authenticating each target user.

FIG. 9 is a schematic diagram that shows a system for implementing the user identification process based on keystroke dynamics according to an exemplary embodiment of the present disclosure. A network system 9301 manages the training and deployment processes for the user identification of the present disclosure. In implementations, network system 9301 embodies one or more of an application server, a network management apparatus, an identity access management (IAM) system, and the like. In embodiments, the user identification process of the present disclosure is applicable to any network management or account management system incorporated in network system 9301 for managing any user registration, authentication, and/or identification tasks.

In some implementations, the system architecture is language neutral allowing REST, JSON and Secure Socket Layers to provide the communication interface between the various computing devices (e.g., 9301 and 9400-1 . . . 9400-*m*). Further, in one or more implementations, the architecture is built on the open secure socket layers, JSON, and/or REST APIs. Accordingly, the disclosed systems for identifying a user can implement open standards, thereby allowing significant interoperability. It should be further understood that while the various computing devices and machines referenced herein, including but not limited to network system 9301, information system 9340, and user devices 9400-1 . . . 9400-*m*, are referred to herein as individual/single devices and/or machines, in certain implementations, the referenced devices and machines, and their associated and/or accompanying operations, features, and/or functionalities can be combined or arranged or otherwise employed across any number of devices and/or machines, such as over a network connection or wired connection, as is known to those of skill in the art. Correspondingly, functionality for any multiple entities can be combined and incorporated to a single apparatus without departing from the spirit and scope of the present disclosure.

As shown in FIG. 9, network system 9301, an information system 9340, and user devices 9400-1 . . . 9400-*m* are in communication with one another via a network 9200. The network 9200 can be the Internet, an intranet network, a local area network, other wireless or other hardwired connection or connections, or a combination of one or more thereof, by which the aforementioned entities can communicate. Communications systems for facilitating network 9200 can include hardware (e.g., hardware for wired and/or wireless connections) and/or software. In embodiments, communications systems can include one or more communications chipsets, such as a GSM chipset, CDMA chipset, LTE chipset, 4G/5G/6G, Wi-Fi chipset, Bluetooth chipset, to name a few, and/or combinations thereof. Wired connections can be adapted for use with cable, plain old telephone service (POTS) (telephone), fiber (such as Hybrid Fiber Coaxial), xDSL, to name a few, and wired connections can use coaxial cable, fiber, copper wire (such as twisted pair copper wire), and/or combinations thereof, to name a few. Wired connections can be provided through telephone ports, Ethernet ports, USB ports, and/or other data ports, such as Apple 30-pin connector ports or Apple Lightning connector ports, to name a few. Wireless connections can include cellular or cellular data connections and protocols (e.g., digital cellular, PCS, CDPD, GPRS, EDGE, CDMA2000, 1×RTT, RFC 1149, Ev-DO, HSPA, UMTS, 3G, 4G, LTE, 5G, and/or 6G to name a few), Bluetooth, Bluetooth Low Energy, Wi-Fi, radio, satellite, infrared connections, ZigBee communication protocols, to name a few. Communications interface hardware and/or software, which can be used to communicate over wired and/or wireless connections, can include Ethernet interfaces (e.g., supporting a TCP/IP stack), X.25 interfaces, T1 interfaces, and/or antennas, to name a few. Computer systems can communicate with other computer systems or devices directly and/or indirectly, e.g., through a data network, such as the Internet, a telephone network, a mobile broadband network (such as a cellular data network), a mesh network, Wi-Fi, WAP, LAN, and/or WAN, to name a few. For example, network(s) 9200 can be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), which are some of the various types of protocols that can be used to facilitate communications between user devices 9400-1 . . . 9400-*m* and network system 9301. According to an exemplary embodiment of the present disclosure, network 9200 is comprised of switches (not shown), routers (not shown), and other computing devices (not shown) for facilitating communications and data exchanges among servers, such as network system 9300 and information system 9340, and clients, such as user devices 9400-1 . . . 9400-*m*, while conforming to the above-described connections and protocols as understood by those of ordinary skill in the art.

In some embodiments, user devices 9400-1 . . . 9400-*m* and network system 9301 can communicate with one another via a web browser using HTTP. Various additional communication protocols can be used to facilitate communications between user devices 9400-1 . . . 9400-*m* and network system 9301, include the following non-exhaustive list, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, and/or SSH.

Correspondingly, as shown in FIG. 9, network system 9301 incorporates communications circuitry ("Network Connection Interface") 9305, one or more processor(s) 9310, and a memory 9315.

Network connection interface 9305 can include any circuitry allowing or enabling one or more components of network system 9301 to communicate with one or more additional devices, servers, and/or systems over network 9200—for example, one or more of information system 9340 and user devices 9400-1 . . . 9400-*m*. Network connection interface 9305 can use any of the previously mentioned exemplary communications protocols. According to an exemplary embodiment, network connection interface 9305 comprises one or more universal serial bus ("USB") ports, one or more Ethernet or broadband ports, and/or any other type of hardwire access port to communicate with network 9200 and, accordingly, information system 9340 and user devices 9400-1 . . . 9400-*m*.

One or more processor(s) 9310 can include any suitable processing circuitry capable of controlling operations and functionality of network system 9301, as well as facilitating communications between various components within network system 9301. In some embodiments, processor(s) 9310 can include a central processing unit ("CPU"), a graphic processing unit ("GPU"), one or more microprocessors, a digital signal processor, or any other type of processor, or any combination thereof. In some embodiments, the functionality of processor(s) 9310 can be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 9310 cam include its own local memory, which can store program systems, program data, and/or one or more operating systems.

Memory 9315 can include one or more types of storage mediums such as any volatile or non-volatile memory, or any removable or non-removable memory implemented in any suitable manner to store data for network system 9301. For example, information can be stored using computer-readable instructions, data structures, and/or program systems. Various types of storage/memory can include, but are not limited to, hard drives, solid state drives, flash memory, permanent memory (e.g., ROM), electronically erasable programmable read-only memory ("EEPROM"), CD ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, memory 9301 can be implemented as computer-readable storage media ("CRSM"), which can be any available physical media accessible by processor(s) 9310 to execute one or more instructions stored within memory 9315. According to an exemplary embodiment, one or more applications corresponding to processes 100 and 200, including the data and network structures illustrated in FIGS. 3-7, are executed by processor(s) 9310. In embodiments, the instructions and data associated with these processes can be stored in memory 9315 and/or information system 9340.

According to an example implementation of the present disclosure, network system 9301 is in communication with information system 9340 via direct connection and/or via network 9200. As illustrated in FIG. 9, information system 9340 maintains one or more database(s) 9345 that embodies servers and corresponding storage media for storing data for network system 9305 and user devices 9400-1 . . . 9400-*m* associated with the training and user identification processes of the present disclosure, as will be understood by one of ordinary skill in the art. For example, database(s) 9345 is used to store the user text input 107 obtained from user devices 9400-1 . . . 9400-*k* for training the keystroke generator 610 (e.g., first training phase step s105) and/or user text input 117 from user device 9400-*m* for training the user identification model (e.g., second training phase step s110). In embodiments, the processes associated with said training (e.g., steps s105 and s110, along with their associated process steps and data structures illustrated in FIGS. 2-7) can be executed, in part or in the whole, by network system 9301 and/or information system 9340. The data resulting from said training can, likewise, be maintained, in part or in the whole, by information system 9340 and/or network system 9301. Correspondingly, the processes and data related to the user identification process (e.g., the deployment of the user identification model at step s115, along with their associated process steps and data structures illustrated in FIGS. 2-7) can be executed/maintained, in part or in the whole, by information system 9340 and/or network system 9301.

Exemplary storage media for the data storage of database(s) 9345 correspond to those described above with respect to memory 9315, which will not be repeated here. In embodiments, information system 9340 can be comprised of one or more database servers that support Oracle SQL, NoSQL, NewSQL, PostgreSQL, MySQL, Microsoft SQL Server, Sybase ASE, SAP HANA, DB2, and the like. Information system 9340 incorporates a network connection interface (not shown) for communications with network 9200 and exemplary implements of which can include those described above with respect to network connection interface 9305, which will not be repeated here.

In embodiments, network system 9301 and/or information system 9340 can implement an application server adapted to host one or more applications that are accessible and executable over network 9200 by users (user #1 . . . user #m) at user devices 9400-1 . . . 9400-*m*. In embodiments, executable portions of applications maintained at the application server can be offloaded to user devices 9400-1 . . . 9400-*m*. For example, graphical user interface renderings and the like can be locally executed at user devices 9400-1 . . . 9400-*m*.

User devices 9400-1 . . . 9400*m* can be any computing device and/or data processing apparatus capable of embodying the systems and/or methods described herein and can include, for each corresponding user (user #1 . . . user #m), any suitable type of electronic device including, but are not limited to, desktop computers, mobile computers (e.g., laptops, ultrabooks), mobile phones, portable computing devices, such as smart phones, tablets, personal display devices, personal digital assistants ("PDAs"), virtual reality devices, wearable devices (e.g., watches), to name a few, with Internet access that is uniquely identifiable by Internet Protocol (IP) addresses, Internet cookies, Media Access Control (MAC) identifiers, or online personal accounts of the individual user (user #1 . . . user #m) associated with the respective user device 9400-1 . . . 9400-*m*, either directly or through another personal device.

User access device 9400-1 is illustrated in FIG. 9 as an exemplary schematic arrangement for user devices 9400-1 . . . 9400-*m*. As shown in FIG. 9, user device 9400-1 includes processor(s) 9410, memory 9420, communication portal 9430, and user interface 9415. Processor(s) 9410, memory 9420, and communication portal 9430 can be implemented in accordance with the exemplary implementations for processor(s) 9310, memory 9315, and network connection interface 9305, respectively, and will not be repeated here. Communications portal 9430 can use any communications protocol, such as any of the previously mentioned exemplary communications protocols. In some embodiments, user device 9400-1 can include one or more antennas to facilitate wireless communications with a network using various wireless technologies (e.g., Wi-Fi, Bluetooth, radiofrequency, etc.). In yet another embodiment, user device 9400-1 can include one or more universal serial bus ("USB") ports, one or more Ethernet or broadband ports, and/or any other type of hardwire access port so that communications portal 9430 allows user device 9400-1 to communicate with one another or with one or more communications networks, including network 9200.

Additionally, processor(s) 9410 can run an operating system ("OS") for personal user device 9400-1, and/or one or more firmware applications, media applications, and/or applications resident thereon. In some embodiments, processor(s) 9410 can run a local client script for reading and rendering content received from one or more websites. For example, processor(s) 9410 can run a local JavaScript client for rendering HTML or XHTML content received from a particular URL (e.g., maintained in association with network system 9301 and/or information system 9340) accessed by personal user device 9400-1.

User interface 9415 is operatively connected to processor(s) 9410 and can include one or more input or output device(s), such as switch(es), button(s), key(s), a touch screen, a display, microphone, camera(s), sensor(s), etc. as would be understood in the art of electronic computing devices. In exemplary implementations, user interface 9415 serves to capture keystrokes by a user (user #1 . . . user #m) related to the training and/or user identification tasks of the present disclosure. For example, user interface 9415 serves to facilitate the capture of user text input 107 from the user (e.g., user #1 . . . user #k) of an associated user device (e.g., 9400-1 . . . 9400-*k*) for training the keystroke sample generator 610 (e.g., first training phase step s105). Correspondingly, user interface 9415 serves to facilitate the capture of user text input 117 from the user (e.g., user #m) of an associated user device (e.g., 9400-*m*) for training the user identification model 820 (e.g., second training phase step s110) and the capture of user text input 127 for identifying the user based on the trained user identification model 820 (e.g., user identification model deployment step s115). Thus, keystrokes inputted via user interface 9415—which can be a physical or virtual keyboard, keypad, or the like—is obtained for training and identification purposes in accordance with processes 100 and 200. Accordingly, FIG. 9 illustrates an exemplary embodiment of the present disclosure of users #1 to #k forming a keystroke sample generator training user pool 9500 from which user text input 107 is obtained for the first training phase and user #m being outside of user pool 9500 from which user text input 117 and 127 is obtained for the second training phase and the user identification task, respectively. In embodiments, user text input 107, 117, and 127 can be obtained from respective users (user #1 . . . user #m) as part of user registration and authentication processes, dedicated system security training processes, and the like.

Examples

To validate the disclosed process in a real setting, a series of experiments employing various binary classifiers on two data sets of users were conducted. Both data sets contained real impostor samples obtained in laboratory conditions. For each of the two data sets, the participants were asked to provide imposter keystrokes for each of the usernames and passwords that were included in the data acquisition experiments. The impostor samples were used for evaluation (testing) purposes because they would not be readily available in a real-world setting. The user identification models were a gradient boosting classifier, a multi-layer perceptron (MLP), a random forest model, and a Support Vector Machines (SVM) model.

To assess the accuracy improvements that were brought by adding synthetic negative keystroke samples generated by the disclosed GPAN, the binary classification models were trained in two scenarios. In the first scenario, the negative data was formed of keystroke examples produced by actual users (other than the target users), but the keystroke samples did not necessarily correspond to the text typed by the target users, i.e., the negative samples were collected from other users while typing their own text inputs. In the second scenario, the negative data was formed of synthetic keystroke examples produced by the disclosed GPAN architecture. The use of the generative models enabled the possibility to obtain negative samples for the same text sequences as that of the positive samples.

Figure 10:
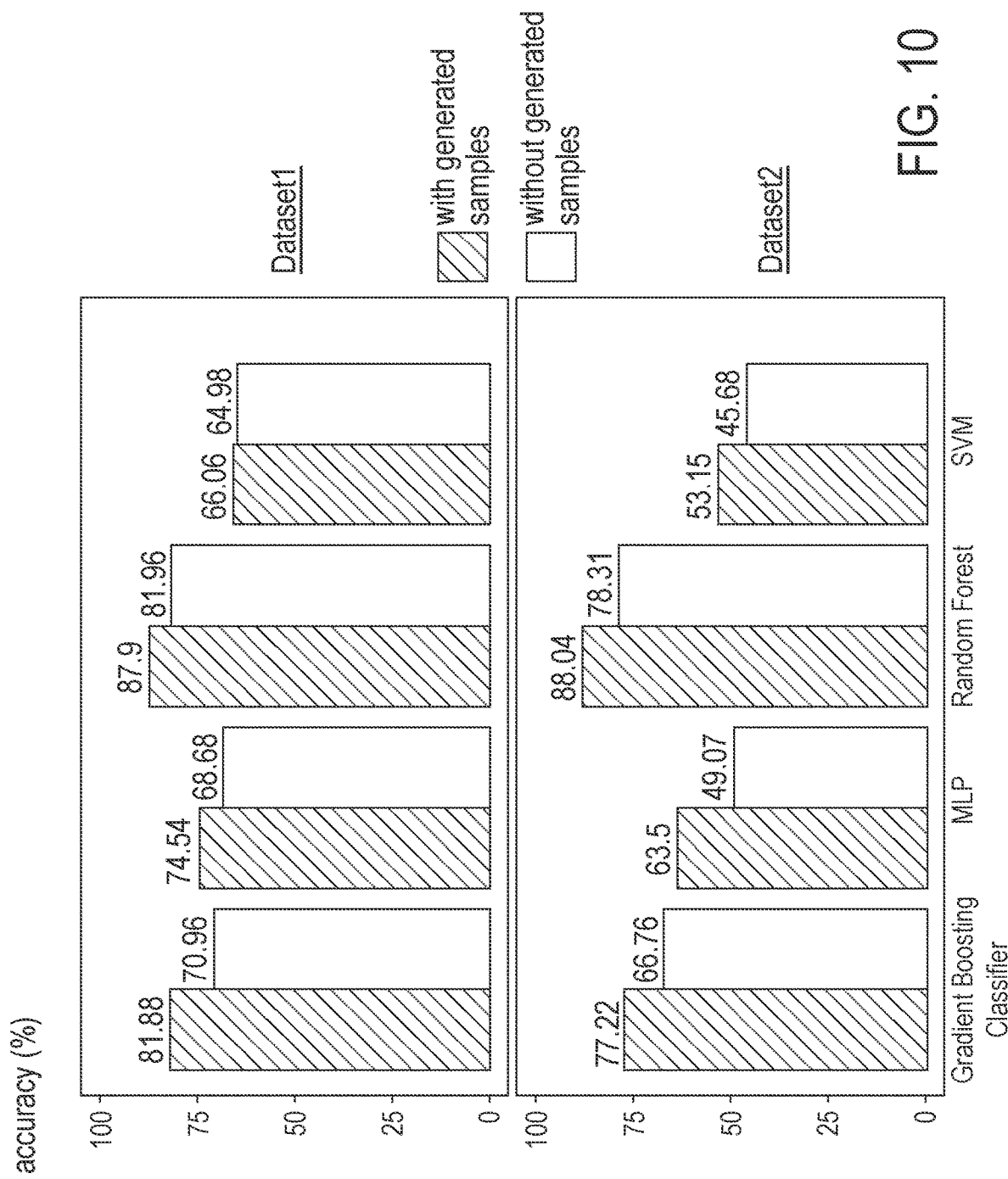
FIG. 10 is a bar graph showing example results comparing user identification results of user identification models trained with keystroke samples generated by a generator trained according to an exemplary embodiment of the present disclosure and results of the same user identification models trained with user-generated free-text negative samples.

The first scenario is used as a baseline, to measure the impact of adding synthetic negative data in the second scenario. The results of the evaluation of the models trained in the two alternative scenarios are shown in FIG. 10. Since the data sets contain keystroke entries for multiple passwords and users, and the machine learning models were created for each unique user and password pair, the values reported in FIG. 10 represent the average accuracy rates obtained for all users in the corresponding data set. The average accuracy rates for data set 1 are listed in the following Table 1 and the average accuracy rates for data set 2 are listed in the following Table 2.

TABLE 1

| (dataset 1) | | |
| --- | --- | --- |
| User Classification Model (820) | Accuracy (%) without generated samples | Accuracy (%) with generated samples (generator 610) |
| Gradient Boosting Classifier | 70.96 | 81.88 |
| MLP | 68.68 | 74.54 |
| Random Forest | 81.96 | 87.90 |
| SVM | 64.98 | 66.06 |

TABLE 2

| (dataset 2) | | |
| --- | --- | --- |
| User Classification Model (820) | Accuracy (%) without generated samples | Accuracy (%) with generated samples (generator 610) |
| Gradient Boosting Classifier | 66.76 | 77.22 |
| MLP | 49.07 | 63.50 |
| Random Forest | 78.31 | 88.04 |
| SVM | 45.68 | 53.15 |

The reported results demonstrate that the disclosed process significantly improves the performance of each classification model, regardless of the data set. Thus, the experiments validate the effectiveness of the disclosed GPAN architecture.

FIG. 10 shows a comparison between the results obtained with and without negative keystroke samples generated by the disclosed GPAN method. The accuracy improvements are significant and consistent across various machine learning models and data sets. As reflected in FIG. 10 and Tables 1 and 2, user identification accuracy improved for every classification model used on the two data sets (up to about 15%), thus verifying the improvement provided by the disclosed GPAN technique over models trained with user-generated free-text negative samples.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

The headings used herein are for organizational purposes only and are not meant to be used to limit the scope of the description or the claims. As used throughout this application, the words "may" and "can" are used in a permissive sense (i.e., meaning having the potential to), rather than the mandatory sense (i.e., meaning must). To facilitate understanding, like reference numerals have been used, where possible, to designate like elements common to the figures. In certain instances, a letter suffix following a dash ( . . . -b) denotes a specific example of an element marked by a particular reference numeral (e.g., 9400-*b*). Description of elements with references to the base reference numerals (e.g., 9400) also refer to all specific examples with such letter suffixes (e.g., 9400-*b*), and vice versa.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof, and are meant to encompass the items listed thereafter and equivalents thereof as well as additional items.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting.

While the disclosure has described several example implementations, it will be understood by those skilled in the art that various changes can be made, and equivalents can be substituted for elements thereof, without departing from the spirit and scope of the disclosure. In addition, many modifications will be appreciated by those skilled in the art to adapt a particular instrument, situation, or material to embodiments of the disclosure without departing from the essential scope thereof. Therefore, it is intended that the disclosure not be limited to the particular embodiments disclosed, or to the best mode contemplated for carrying out this disclosure, but that the disclosure will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope encompassed by the present disclosure, which is defined by the set of recitations in the following claims and by structures and functions or steps which are equivalent to these recitations.

What is claimed is:

1. An apparatus adapted to identify a user based on keystroke dynamics of an input by the user, comprising:
   a communication interface to one or more networks;
   one or more processing devices operatively connected to the computer network interface; and
   one or more memory storage devices operatively connected to the one or more processing devices and having stored thereon machine-readable instructions that, when executed, cause the one or more processing devices to:
   in a first training phase of training a keystroke sample generator,
   receive, via the communication interface, a plurality of first text input samples by a plurality of first users; and
   for each received first text input sample:
   generate a user identification representation, a noise representation, and a text sequence representation of the received first text input sample;
   generate, using the keystroke sample generator, a keystroke sequence sample based on a combination of the generated user identification representation, noise representation, and text sequence representation;
   input the generated keystroke sequence sample and an actual keystroke sequence of the received first text input sample to a classifier for a user identification classification on the generated keystroke sequence sample;
   input the generated keystroke sequence sample and the actual keystroke sequence of the received first text input sample to a regressor for a text character length regression on the generated keystroke sequence sample; and
   train the keystroke sample generator based on the user identification classification of the classifier and the text character length classification of the regressor;
   in a second training phase of training a user identification model,
   receive, via the communication interface, one or more second text input samples by a second user, said second user being different from the plurality of first users;
   generate, using the keystroke sample generator, a plurality of negative keystroke samples based on the one or more second text input samples; and
   train the user identification model on a user classification of the second user based on the one or more second text input samples and the generated plurality of negative keystroke samples; and
   in a deployment of the user identification model,
   receive, via the communication interface, a third text input sample in association with the second user; and
   authenticate the third text input sample using the trained user identification model.

2. The apparatus of claim 1, wherein the user identification representation and the text sequence representation are generated using respective embedding neural layers.

3. The apparatus of claim 1, wherein the user identification representation and the noise representation are generated to conform to a format of the text sequence representation using respective neural layers.

4. The apparatus of claim 1, wherein the classifier is a multi-class discriminator embodied by a neural network and the regressor is a regression neural network.

5. The apparatus of claim 4, wherein the training of the keystroke sample generator, the user identification classification by the classifier, and the text character length regression by the regressor are based on $$L(G,D,R,x,u,t) = L_{GAN}(G,D,x,u,t) + \lambda_1 \cdot L_{time}(G,u,t) + \lambda_2 \cdot L_{MSE}(G,R,x,t)$$

where:
G represents the keystroke sample generator,
D represents the multi-class discriminator,
R represents the regressor,
x represents an array of press and release timestamps for a typed text sequence of the received first text input sample,
t represents the typed text sequence of the received first text input sample,
u represents a one-hot encoded vector representing an ID associated with one of the plurality of first users that typed the received first text input sample or a label indicating that an input sample to the classifier is generated,
$\lambda_1$ is a hyperparameter that controls an importance of a temporal consistency loss (denoted as $L_{time}$),
$\lambda_2$ is a hyperparameter that controls an importance of a mean square error (MSE) loss (denoted as $L_{MSE}$) with respect to the text character length of the generated keystroke sequence sample, $$L_{GAN}(G,D,x,u,t) = E_{x \sim p_{data}(x)}[-\Sigma_{i=1}^{k} u_i \cdot \log(D(x))] + E_{z \sim p_z(z)}[-\Sigma_{i=1}^{m} u_i \cdot \log(D(G(z|u,t)))]$$

E represents an expected value ((average) of each formula included in square brackets),
$p_{data}$ represents a probability distribution of data,
x is a data point sampled from the distribution $p_{data}$, $E_{x \sim p_{data}}(x)$ is the expected value over all data points,
$p_z$ represents a noise distribution,
z is a noise vector sampled from the distribution $p_z$,
$E_{z \sim p_z(z)}$ is the expected value over all noise vectors,
m represents a number of the plurality of first users,
k represents a number of the plurality of second users, $$L_{time}(G,u,t) = E_{z \sim p_z}(z)[\Sigma_{i=1}^{n} \max(0, y_{i,0} - y_{i,1}) + \Sigma_{i=1}^{n-1} \max(0, y_{i,0} - y_{i+1,0})]$$

y=G(z|u,t), therefore $y_{i,0}$ and $y_{i,1}$ represent press and release timestamps of an i-th key in the sequence t,
n represents a sequence length, and $$L_{MSE}(G,R,x,t) = E_{x \sim p_{data}(x)}[(R(x) - len(t))^2] + E_{z \sim p_z(z)}[(R(G(z|u,t)) - len(t))^2]$$

len is a function that returns a length of a sequence t.

6. The apparatus of claim 1, wherein the plurality of negative keystroke samples are generated by the generator based on one or more of the plurality of first text input samples in association with one or more of the plurality of first users, which are different from the second user.

7. The apparatus of claim 6, wherein at least one of the negative keystroke samples is generated based on one of the plurality of first text input samples that comprises a same character sequence as the one or more second text input samples.

8. The apparatus of claim 1, wherein the user identification model is a binary classifier that determines whether a keystroke sequence of the third text input sample corresponds to the second user based on the user classification training.

9. The apparatus of claim 1, wherein the plurality of first text input samples comprise free text inputs by the plurality of first users.

10. The apparatus of claim 1, wherein the one or more second text input samples comprise a fixed text input by the second user.

11. A method for identifying a user based on keystroke dynamics of an input by the user, comprising:
in a first training phase of training a keystroke sample generator,
receiving, by a processing apparatus via a communication interface, a plurality of first text input samples by a plurality of first users; and
for each received first text input sample:
generating, by the processing apparatus, a user identification representation, a noise representation, and a text sequence representation of the received first text input sample;
generating, by the processing apparatus using the keystroke sample generator, a keystroke sequence sample based on a combination of the generated user identification representation, noise representation, and text sequence representation;
inputting, by the processing apparatus, the generated keystroke sequence sample and an actual keystroke sequence of the received first text input sample to a classifier for a user identification classification on the generated keystroke sequence sample;
inputting, by the processing apparatus, the generated keystroke sequence sample and the actual keystroke sequence of the received first text input sample to a regressor for a text character length regression on the generated keystroke sequence sample; and
training, by the processing apparatus, the keystroke sample generator based on the user identification classification of the classifier and the text character length classification of the regressor;
in a second training phase of training a user identification model,
receiving, by the processing apparatus via the communication interface, one or more second text input samples by a second user, said second user being different from the plurality of first users;
generating, by the processing apparatus using the keystroke sample generator, a plurality of negative keystroke samples based on the one or more second text input samples; and
training, by the processing apparatus, the user identification model on a user classification of the second user based on the one or more second text input samples and the generated plurality of negative keystroke samples; and
in a deployment of the user identification model,
receiving, by the processing apparatus via the communication interface, a third text input sample in association with the second user; and
authenticating, by the processing apparatus, the third text input sample using the trained user identification model.

12. The method of claim 11, wherein the user identification representation and the text sequence representation are generated using respective embedding neural layers.

13. The method of claim 11, wherein the user identification representation and the noise representation are generated to conform to a format of the text sequence representation using respective neural layers.

14. The method of claim 11, wherein the classifier is a multi-class discriminator embodied by a neural network and the regressor is a regression neural network.

15. The method of claim 14, wherein the training of the keystroke sample generator, the user identification classification by the classifier, and the text character length regression by the regressor are based on $$L(G,D,R,x,u,t) = L_{GAN}(G,D,x,u,t) + \lambda_1 \cdot L_{time}(G,u,t) + \lambda_2 \cdot L_{MSE}(G,R,x,t)$$

where:
G represents the keystroke sample generator,
D represents the multi-class discriminator,
R represents the regressor,
x represents an array of press and release timestamps for a typed text sequence of the received first text input sample,
t represents the typed text sequence of the received first text input sample,
u represents a one-hot encoded vector representing an ID associated with one of the plurality of first users that typed the received first text input sample or a label indicating that an input sample to the classifier is generated,
$\lambda_1$ is a hyperparameter that controls an importance of a temporal consistency loss (denoted as $L_{time}$),
$\lambda_2$ is a hyperparameter that controls an importance of a mean square error (MSE) loss (denoted as $L_{MSE}$) with respect to the text character length of the generated keystroke sequence sample, $$L_{GAN}(G,D,x,u,t) = E_{x \sim p_{data}(x)}[-\Sigma_{i=1}^{k} u_i \cdot \log(D(x))] + E_{z \sim p_z(z)}[-\Sigma_{i=1}^{m} u_i \cdot \log(D(G(z|u,t)))]$$

E represents an expected value ((average) of each formula included in square brackets),
$p_{data}$ represents a probability distribution of data, x is a data point sampled from the distribution $p_{data}$,
$E_{x \sim p_{data}(x)}$ is the expected value over all data points,
$p_z$ represents a noise distribution,
z is a noise vector sampled from the distribution $p_z$,
$E_{z \sim p_z(z)}$ is the expected value over all noise vectors,
m represents a number of the plurality of first users,
k represents a number of the plurality of second users, $$L_{time}(G,u,t) = E_{z \sim p_z(z)}[\Sigma_{i=1}^{n} \max(0, y_{i,0} - y_{i,1}) + \Sigma_{i=1}^{n-1} \max(0, y_{i,0} - y_{i+1,0})]$$

$y = G(z|u,t)$, therefore $y_{i,0}$ and $y_{i,1}$ represent press and release timestamps of an i-th key in the sequence t,
n represents a sequence length, and $$L_{MSE}(G,R,x,t) = E_{x \sim p_{data}(x)}[(R(x) - len(t))^2] + E_{z \sim p_z(z)}[(R(G(z|u,t)) - len(t))^2]$$

len is a function that returns a length of a sequence t.

16. The method of claim 11, wherein the plurality of negative keystroke samples are generated by the generator based on one or more of the plurality of first text input samples in association with one or more of the plurality of first users, which are different from the second user.

17. The method of claim 16, wherein at least one of the negative keystroke samples is generated based on one of the plurality of first text input samples that comprises a same character sequence as the one or more second text input samples.

18. The method of claim 11, wherein the user identification model is a binary classifier that determines whether a keystroke sequence of the third text input sample corresponds to the second user based on the user classification training.

19. The method of claim 11, wherein the plurality of first text input samples comprise free text inputs by the plurality of first users.

20. The method of claim 11, wherein the one or more second text input samples comprise a fixed text input by the second user.

* * * * *